United States Patent
Stolfo et al.

(10) Patent No.: US 9,311,476 B2
(45) Date of Patent: *Apr. 12, 2016

(54) METHODS, SYSTEMS, AND MEDIA FOR MASQUERADE ATTACK DETECTION BY MONITORING COMPUTER USER BEHAVIOR

(71) Applicant: The Trustees of Columbia University in the City of New York, New York, NY (US)

(72) Inventors: Salvatore J. Stolfo, Ridgewood, NJ (US); Malek Ben Salem, New York, NY (US); Shlomo Hershkop, Brooklyn, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/272,099

(22) Filed: May 7, 2014

(65) Prior Publication Data

US 2016/0065614 A1      Mar. 3, 2016

Related U.S. Application Data

(63) Continuation of application No. 12/628,587, filed on Dec. 1, 2009, now Pat. No. 8,769,684.

(60) Provisional application No. 61/119,294, filed on Dec. 2, 2008, provisional application No. 61/119,540, filed on Dec. 3, 2008.

(51) Int. Cl.
*G06F 21/00* (2013.01)
*G06F 21/55* (2013.01)
(Continued)

(52) U.S. Cl.
CPC ............... *G06F 21/55* (2013.01); *G06F 21/50* (2013.01); *G06F 21/554* (2013.01); *H04L 63/1408* (2013.01); *H04L 63/1425* (2013.01); *G06F 21/552* (2013.01); *G06F 21/566* (2013.01)

(58) Field of Classification Search
CPC ................................ H04L 63/14; G06F 21/05
USPC ......... 726/22–25; 713/187–188; 709/223–229
See application file for complete search history.

(56) References Cited

U.S. PATENT DOCUMENTS 5,440,723 A   8/1995   Arnold et al.
5,621,889 A   4/1997   Lermuzeaux et al.
(Continued)

FOREIGN PATENT DOCUMENTS

WO    WO/2008/041915    12/1899

OTHER PUBLICATIONS

Yeung, Dit-Yan, and Yuxin Ding. "Host-based intrusion detection using dynamic and static behavioral models." Pattern recognition 36.1 (2003): 229-243.*

(Continued)

*Primary Examiner* — Madhuri Herzog
(74) *Attorney, Agent, or Firm* — Byrne Poh LLP

(57) ABSTRACT

Methods, systems, and media for masquerade attack detection by monitoring computer user behavior are provided. In accordance with some embodiments, a method for detecting masquerade attacks is provided, the method comprising: monitoring, using a hardware processor, a first plurality of user actions in a computing environment; generating a user intent model based on the first plurality of user actions; monitoring a second plurality of user actions in the computing environment; determining whether at least one of the second plurality of user actions deviates from the generated user intent model; determining whether the second plurality of user actions include performing an action on a file in the computing environment that contains decoy information in response to determining that at least one of the second plurality of user actions deviates from the generated user intent model; and generating an alert in response to determining that the second plurality of user actions include performing an action on a file in the computing environment that contains decoy information.

21 Claims, 7 Drawing Sheets

(51) Int. Cl.
*H04L 29/06* (2006.01)
*G06F 21/50* (2013.01)
*G06F 21/56* (2013.01)

(56) References Cited

U.S. PATENT DOCUMENTS

| | | | |
|---|---|---|---|
| 5,796,952 A | 8/1998 | Davis et al. | |
| 5,987,611 A | 11/1999 | Freund | |
| 5,991,714 A | 11/1999 | Shaner | |
| 6,108,799 A | 8/2000 | Boulay et al. | |
| 6,405,318 B1* | 6/2002 | Rowland | 726/22 |
| 6,408,391 B1 | 6/2002 | Huff et al. | |
| 6,671,811 B1* | 12/2003 | Diep et al. | 726/23 |
| 6,687,833 B1 | 2/2004 | Osborne et al. | |
| 6,963,983 B2 | 11/2005 | Munson et al. | |
| 7,093,291 B2* | 8/2006 | Bailey | 726/23 |
| 7,152,242 B2 | 12/2006 | Douglas | |
| 7,155,509 B1 | 12/2006 | Cordsmeyer et al. | |
| 7,355,600 B2 | 4/2008 | Baraff et al. | |
| 7,356,844 B2 | 4/2008 | Lyle et al. | |
| 7,424,735 B2 | 9/2008 | Sorkin et al. | |
| 7,428,484 B2 | 9/2008 | Yun et al. | |
| 7,463,265 B2 | 12/2008 | Styles | |
| 7,464,407 B2 | 12/2008 | Nakae et al. | |
| 7,464,408 B1 | 12/2008 | Shah et al. | |
| 7,475,405 B2 | 1/2009 | Manganaris et al. | |
| 7,545,379 B2 | 6/2009 | Xie et al. | |
| 7,603,709 B2 | 10/2009 | Lewis et al. | |
| 7,636,944 B2 | 12/2009 | Raikar | |
| 7,673,147 B2 | 3/2010 | Moghe et al. | |
| 7,716,181 B2 | 5/2010 | Todd | |
| 7,788,071 B2 | 8/2010 | Bond et al. | |
| 7,908,652 B1 | 3/2011 | Austin et al. | |
| 7,984,100 B1 | 7/2011 | King et al. | |
| 8,122,505 B2 | 2/2012 | Verma | |
| 8,776,168 B1 | 7/2014 | Gibson et al. | |
| 9,117,078 B1 | 8/2015 | Chien et al. | |
| 2002/0035696 A1 | 3/2002 | Thacker | |
| 2002/0066034 A1* | 5/2002 | Schlossberg et al. | 713/201 |
| 2002/0116635 A1 | 8/2002 | Sheymov | |
| 2002/0184528 A1 | 12/2002 | Shevenell et al. | |
| 2002/0197978 A1 | 12/2002 | Zavidniak | |
| 2004/0049693 A1 | 3/2004 | Douglas | |
| 2004/0111632 A1 | 6/2004 | Halperin | |
| 2004/0148521 A1 | 7/2004 | Cohen et al. | |
| 2004/0172557 A1 | 9/2004 | Nakae et al. | |
| 2004/0260733 A1 | 12/2004 | Adelstein et al. | |
| 2005/0071643 A1* | 3/2005 | Moghe | 713/182 |
| 2005/0172115 A1 | 8/2005 | Bodorin et al. | |
| 2005/0188272 A1 | 8/2005 | Bodorin et al. | |
| 2005/0265331 A1 | 12/2005 | Stolfo et al. | |
| 2005/0281291 A1 | 12/2005 | Stolfo et al. | |
| 2006/0015630 A1 | 1/2006 | Stolfo et al. | |
| 2006/0085854 A1 | 4/2006 | Agrawal et al. | |
| 2006/0123083 A1 | 6/2006 | Goutte et al. | |
| 2006/0242694 A1 | 10/2006 | Gold et al. | |
| 2006/0253578 A1 | 11/2006 | Dixon et al. | |
| 2006/0265750 A1 | 11/2006 | Huddleston | |
| 2007/0101430 A1 | 5/2007 | Raikar | |
| 2007/0157289 A1 | 7/2007 | Newton et al. | |
| 2007/0162548 A1 | 7/2007 | Bilkhu et al. | |
| 2007/0250930 A1 | 10/2007 | Aziz et al. | |
| 2007/0271614 A1 | 11/2007 | Capalik | |
| 2007/0283434 A1* | 12/2007 | Cohen | G06F 21/554 726/22 |
| 2007/0283435 A1 | 12/2007 | Cohen et al. | |
| 2007/0291043 A1 | 12/2007 | Bruderlin et al. | |
| 2008/0022400 A1 | 1/2008 | Cohen et al. | |
| 2009/0007270 A1 | 1/2009 | Futoransky et al. | |
| 2009/0028135 A1 | 1/2009 | Mantripragada et al. | |
| 2009/0044042 A1 | 2/2009 | Fujiwara et al. | |
| 2009/0083855 A1* | 3/2009 | Apap | G06F 21/552 726/24 |
| 2009/0227281 A1 | 9/2009 | Hammad et al. | |
| 2009/0292696 A1 | 11/2009 | Shuster | |
| 2009/0293121 A1 | 11/2009 | Bigus et al. | |
| 2010/0064370 A1 | 3/2010 | Thiebeauld De la Crouee et al. | |
| 2010/0077483 A1 | 3/2010 | Stolfo et al. | |
| 2010/0132038 A1 | 5/2010 | Zaitsev | |
| 2010/0269175 A1 | 10/2010 | Stolfo et al. | |
| 2011/0010470 A1 | 1/2011 | Hulbert et al. | |
| 2011/0093630 A1 | 4/2011 | Arnholt, Jr. et al. | |
| 2011/0167493 A1 | 7/2011 | Song et al. | |

OTHER PUBLICATIONS

Attenberg, J., et al., "Modeling and Predicting User Behavior in Sponsored Search", In Proceedings of the 15th ACM SIGKDD International Conference on Knowledge Discovery and Data Mining (KDD '09), Paris, FR, Jun. 28-Jul. 1, 2009, pp. 1067-1076.

Baeza-Yates, R., et al., "Modeling User Search Behavior", In Proceedings of the 3rd Latin American Web Congress (LA-WEB '05), Buenos Aires, AR, Oct. 31-Nov. 2, 2005, pp. 242-251.

Balajinath, B. and Raghavan, S.V., "Intrusion Detection Through Learning Behavior Model", In Computer Communications, vol. 24, No. 12, Jul. 2001, pp. 1202-1212.

Bell, D.E., and LaPadula, L.J., "Secure Computer Systems: Mathematical Foundations and Model", Technical Report ESD-TR-74-244, Mitre Corp, Bedford, MA, USA, Nov. 1973, pp. 1-33.

Bowen, B.M., et al., "Baiting Inside Attackers Using Decoy Documents", In Proceedings of the 5th International ICST Conference on Security and Privacy in Communication Networks (SecureComm '09), Athens, GR, Sep. 14-18, 2009, pp. 51-70.

Chang, C.C. and Lin, C.J., "LIBSVM: A Library for Support Vector Machines", Technical Report, Jan. 2008, pp. 1-39, available at: http://www.csie.ntu.tv/cjlin/libsvm.pdf.

Chinchani, R., et al., "RACOON: Rapidly Generating User Command Data for Anomaly Detection from Customizable Templates", In Proceedings of the 20th Annual Computer Security Applications Conference (ACSAC '04), Tucson, AZ, USA, Dec. 6-10, 2004, pp. 189-204.

Clark, D.D. and Wilson, D.R., "A Comparison of Commercial and Military Computer Security Policies", In Proceedings of the IEEE Symposium on Security and Privacy (S&P '87), Oakland, CA, USA, Apr. 27-29, 1987, pp. 184-194.

Costa, P.C.G., et al., "DTB Project: A Behavioral Model for Detecting Insider Threats", In Proceedings of the International Conference on Intelligence Analysis, McLean, VA, USA, May 2-6, 2005, pp. 1-6.

Coull, S., et al., "Intrusion Detection: A Bioinformatics Approach", In Proceedings of the 19th Annual Computer Security Applications Conference (ACSAC '03), Las Vegas, NV, US, Dec. 8-12, 2003, pp. 24-33.

Coull, S.E. and Szymanski, B.K., "Sequence Alignment for Masquerade Detection", In Computational Statistics & Data Analysis, vol. 52, No. 8, Apr. 15, 2008, pp. 4116-4131.

Dash, S.K., et al., "Masquerade Detection Using IA Network", In Proceedings of the 1st International Workshop on Applications of Constraint Satisfaction and Programming to Computer Security Problems (CPSec '05), Sitges, ES, Oct. 1, 2005, pp. 18-30.

Davison, B.D. and Hirsh, H., "Predicting Sequences of User Actions", In Proceedings of the Workshop on Predicting the Future: AI Approaches to Time-Series Problems, Madison, WI, US, Jul. 27, 1998, pp. 5-12.

Davison, B.D. and Hirsh, H., "Toward an Adaptive Command Line Interface", In Proceedings of the Seventh International Conference on Human-Computer Interaction (HCI '97), San Francisco, CA, US, Aug. 24-29, 1997, pp. 505-508.

DuMouchel, W., "Computer Intrusion Detection Based on Bayes Factors for Comparing Command Transition Probabilities", Technical Report TR91, National Institute of Statistical Sciences, Feb. 1999, pp. 1-14.

Forrest, S., et al., "A Sense of Self for Unix Processes", In Proceedings of the IEEE Symposium on Security and Privacy, Oakland, CA, US, May 6-8, 1996, pp. 120-128.

Ghosh, A.K., et al. "Learning Program Behavior Profiles for Intrusion Detection", In Proceedings of the Workshop on Intrusion Detection and Network Monitoring, Santa Clara, CA, US, Apr. 9-12, 1999, pp. 51-62.

(56) References Cited

OTHER PUBLICATIONS

Goldring, T., "User Profiling for Intrusion Detection in Windows NT", In Proceedings of the 35th Symposium on the Interface: Computing Science and Statistics, Salt Lake City, UT, USA, Mar. 12-15, 2003, pp. 524-527.
Gordon, L.A., et al., "CSI/FBI Computer Crime and Security Survey", Computer Security Institute, Jul. 2006, pp. 1-27, available at: http://gocsi.com/SurveyArchive.
Harmon, D., et al., "Robust Treatment of Simultaneous Collisions", In SIGGRAPH ACM Transactions on Graphics, vol. 27, No. 3, Aug. 2008, pp. 1-4.
Jha, S., et al., "A Filtering Approach to Anomaly and Masquerade Detection", Technical Report, University of Wisconsin, 2004 (month unknown), pp. 1-21.
Jones, A.K. and Sielken, R.S., "Computer System Intrusion Detection: A Survey", Technical Report, University of Virginia, Feb. 9, 2000, pp. 1-25.
Ju, W.H. and Vardi, Y., "A Hybrid High-Order Markov Chain Model for Computer Intrusion Detection", Technical Report No. 92, National Institute of Statistical Sciences, Feb. 1999, pp. 1-24.
Killourhy, K. and Maxion, R.A., "Investigating a Possible Flaw in a Masquerade Detection System", Technical Report CS-TR-896, Newcastle University, Nov. 2004, pp. 1-11.
Lane, T. and Brodley, C.E., "Sequence Matching and Learning in Anomaly Detection for Computer Security", In Proceedings of the Workshop on AI Approaches to Fraud Detection and Risk Management (AAAI-97), Providence, RI, USA, Jul. 27-31, 1997, pp. 43-49.
Laskey, K., et al., "Detecting Threatening Behavior Using Bayesian Networks", In Proceedings of the 13th Conference on Behavior Representation in Modeling and Simulation (BRIMS '04), Arlington, VA, USA, May 17-20, 2004, pp. 136-145.
Li, L. and Manikopoulos C.N., "Windows NT One-Class Masquerade Detection", In Proceedings of the 5th Annual IEEE Workshop on Information Assurance, West Point, NY, USA, Jun. 10-11, 2004, pp. 82-87.
Mahoney et al., "Learning Nonstationary Models of Normal Network Traffic for Detecting Novel Attacks", In Proceedings of the Eighth ACM SIGKDD International Conference on Knowledge Discovery and Data Mining (SIGKDD '02), Edmonton, Alberta, CA, Jul. 23-26, 2002, pp. 376-385.
Maloof, M.A. and Stephens, G.D., "Elicit: A System for Detecting Insiders Who Violate Need-to-Know", In Proceedings of the 10th International Conference on Recent Advances in Intrusion Detection (RAID '07), Gold Goast, AU, Sep. 5-7, 2007, pp. 146-166.
Maxion, R.A. and Townsend T.N., "Masquerade Detection Using Truncated Command Lines", In Proceedings of the International Conference on Dependable Systems & Networks (DSN '02), Bethesda, MD, US, Jun. 23-26, 2002, pp. 219-228.
Maxion, R.A. and Townsend, T.N., "Masquerade Detection Augmented with Error Analysis", In IEEE Transactions on Reliability, vol. 53, No. 1, Mar. 2004, pp. 124-147.
Maxion, R.A., "Masquerade Detection Using Enriched Command Lines", In Proceedings of the International Conference on Dependable Systems & Networks (DSN '03), San Francisco, CA, US, Jun. 22-25, 2003, pp. 5-14.
Maybury, M., et al., "Analysis and Detection of Malicious Insiders", In Proceedings of the International Conference on Intelligence Analysis, McLean, VA, USA, May 2-3, 2005, pp. 1-5.
Nguyen, N., et al., "Detecting Insider Threats by Monitoring System Call Activity", In Proceedings of the Man and Cybernetics Society Information Assurance Workshop (IAW '03), West Point, NY, USA, Jun. 18-20, 2003, pp. 45-52.
Notice of Allowance dated Dec. 23, 2013 in U.S. Appl. No. 12/628,587.
O'Brien, M., and Keane, M.T., "Modeling User Behavior Using a Search Engine", In Proceedings of the 12th International Conference on Intelligent User Interfaces (IUI '07), Honolulu, HI, US, Jan. 28-31, 2007, pp. 357-360.
Office Action dated Mar. 21, 2012 in U.S. Appl. No. 12/628,587.
Office Action dated Nov. 29, 2012 in U.S. Appl. No. 12/628,587.
Oka, M., et al., "Anomaly Detection Using Layered Networks Based on Eigen Co-Occurrence Matrix", In Proceedings of the International Symposium on Recent Advances in Intrusion Detection (RAID '04), Sophia Antipolis, FR, Sep. 15-17, 2004, pp. 223-237.
Oka, M., et al., "Eigen Co-Occurrence Matrix Method for Masquerade Detection", In Proceedings of the 7th JSSST SIGSYS Workshop on Systems for Programming and Applications (SPA '04), Nagano, JP, Mar. 2004, pp. 1-7.
Phyo, A.H. and Furnell, S.M., "A Detection-Oriented Classification of Insider IT Misuse", In Proceedings of the 3rd USENIX Security Conference, Las Vegas, NV, USA, Apr. 14-15, 2004, pp. 1-12.
Prevelakis, V. and Spinellis, D., "The Athens Affair", In IEEE Spectrum, vol. 44, No. 7, Jul. 2007, pp. 26-33.
Randazzo, M.R., et al., "Insider Threat Study: Illicit Cyber Activity in the Banking and Finance Sector", Technical Report, Carnegie Mellon University, Jun. 2005, pp. 1-28.
Salem, M.B. and Stolfo, S.J., "Masquerade Attack Detection Using a Search-Behavior Modeling Approach", Technical Report CUCS-027-09, Columbia University, 2009 (month unknown), pp. 1-17.
Salem, M.B. and Stolfo, S.J., "Masquerade Detection Using a Taxonomy-Based Multinomial Modeling Approach in UNIX Systems", Technical Report CUCS-021-08, Columbia University, 2008 (month unknown), pp. 1-14.
Scholkopf, B., et al., "Estimating the Support of a High-Dimensional Distribution", Technical Report MSR-TR-99-87, Microsoft Research, Sep. 18, 2000, pp. 1-30.
Schonlau, M., "Masquerading User Data", accessed Jun. 13, 2012, pp. 1-2, available at: http://www.schonlau.net/intrusion.html.
Schonlau, M., et al., "Computer Intrusion: Detecting Masquerades", In Statistical Science, vol. 16, No. 1, Feb. 2001, pp. 58-74.
Schultz, E.E., "A Framework for Understanding and Predicting Insider Attacks", In Journal of Computers and Security, vol. 21, No. 1, Oct. 1, 2002, pp. 526-531.
Sekar, R., et al., "A Fast Automaton-Based Method for Detecting Anomalous Program Behaviors", In Proceedings of the IEEE Symposium on Security & Privacy (S&P '01), Oakland, CA, US, May 14-16, 2001, pp. 144-155.
Seo, J. and Cha, S., "Masquerade Detection Based on SVM and Sequence-Based User Commands Profile", In Proceedings of the 2nd ACM Symposium on Information, Computer and Communications Security (ASIACCS '07), SG, Mar. 20-22, 2007, pp. 398-400.
Shavlik, J. and Shavlik, M., "Selection, Combination, and Evaluation of Effective Software Sensors for Detecting Abnormal Computer Usage", In Proceedings of the 10th ACM SIGKDD International Conference on Knowledge Discovery and Data Mining (KDD '04), Seattle, WA, USA, Aug. 22-25, 2004, pp. 276-285.
Spitzner, L., "Honeypots: Catching the Insider Threat", In Proceedings of the 19th Annual Computer Security Applications Conference (ACSAC '03), Las Vegas, NV, USA, Dec. 8-12, 2003, pp. 170-179.
Stolfo, S.J., et al., "A Comparative Evaluation of Two Algorithms for Windows Registry Anomaly Detection", In Journal of Computer Security, vol. 13, No. 4, Jul. 2005, pp. 659-693.
Stolfo, S.J., et al., "Anomaly Detection in Computer Security and an Application to File System Accesses", In Proceedings of the 15th International Syposium on Methodologies for Intelligent Systems (ISMIS '05), Saratoga Springs, NY, USA, May 25-28, 2005, pp. 14-28.
Stolfo, S.J., et al., "Insider Attack and Cyber Security: Beyond the Hacker", Springer, Apr. 7, 2008, pp. 1-228.
Szymanski, B.K. and Zhang, Y., "Recursive Data Mining for Masquerade Detection and Author Identification", In Proceedings from the 5th Annual IEEE SMC Information Assurance Workshop, West Point, NY, US, Jun. 10-11, 2004, pp. 424-431.
Tan, K.M.C. and Maxion, R.A., "'Why 6?' Defining the Operational Limits of Stide, and Anomaly-Based Intrusion Detector", In Proceedings of the IEEE Symposium on Security and Privacy (S&P '02), Berkeley, CA, USA, May 12-15, 2002, pp. 188-201.
Teng, H.S., et al., "Adaptive Real-Time Anomaly Detection Using Inductively Generated Sequential Patterns", In Proceedings of the IEEE Symposium on Security and Privacy (S&P '90), Oakland, CA, US, May 7-9, 1990, pp. 278-284.
U.S. Appl. No. 12/628,587, filed Dec. 1, 2009.
U.S. Appl. No. 61/119,294, filed Dec. 2, 2008.

(56) References Cited

OTHER PUBLICATIONS

U.S. Appl. No. 61/119,540, filed Dec. 3, 2008.
Wang, K. and Stolfo, S.J., "One-Class Training for Masquerade Detection", In Proceedings of the Workshop on Data Mining for Computer Security (DMSEC '03), Melbourne, FL, US, Nov. 19-22, 2003, pp. 1-10.
Ye, N., et al., "Probabilistic Techniques for Intrusion Detection Based on Computer Audit Data", In IEEE Transactions on Systems, Man and Cybernetics, Part A, vol. 31, No. 4, Jul. 2001, pp. 266-274.
Yung, K.H., "Using Self-Consistent Naïve-Bayes to Detect Masqueraders", In Proceedings of the Advances in Knowledge Discovery and Data Mining, 8th Pacific-Asia Conference (PAKDD '04), Sydney, AU, May 26-28, 2004, pp. 329-340.
Yung, K.H., "Using Self-Consistent Naïve-Bayes to Detect Masqueraders", In Stanford Electrical Engineering and Computer Science Research Journal, 2004 (month unknown), pp. 14-21.
Abou-Assaleh, T., et al., "Detection of New Malicious Code Using N-grams Signatures", In Proceedings of Second Annual Conference on Privacy, Security and Trust (PST '04), Fredericton, NB, CA, US, Oct. 13-15, 2004, pp. 193-196.
Abou-Assaleh, T., et al., "N-Gram-Based Detection of New Malicious Code", In Proceedings of the 28th International Computer Software and Applications Conference (COMPSAC '04), HK, Sep. 28-30, 2004, pp. 41-42.
Aha, D.W., et al., "Instance-Based Learning Algorithms", In Machine Learning, vol. 6, No. 1, Jan. 1991, pp. 37-66.
Akritidis, P., et al., "Proximity Breeds Danger: Emerging Threats in Metro-Area Wireless Networks", In Proceedings of the 16th USENIX Security Symposium, Boston, MA, US, Aug. 6-10, 2007, pp. 323-338.
Arbaugh, W.A., "Chaining Layered Integrity Checks", PhD Thesis, University of Pennsylvania, 1999 (month unknown), pp. 1-118.
Arbaugh, W.A., et al., "A Secure and Reliable Bootstrap Architecture", In IEEE Security and Privacy Conference, Oakland, CA, US, May 4-7, 1997, pp. 65-71.
Bailey, M., et al., "The Blaster Worm: Then and Now", In IEEE Security & Privacy, vol. 3, No. 4, Jul./Aug. 2005, pp. 26-31.
Barham, P., et al., "Xen and the Art of Virtualization", In Proceedings of the Nineteenth ACM Symposium on Operating Systems Principles (SOSP '03), vol. 37, No. 5, Bolton Landing, NY, US, Oct. 19-22, 2003, pp. 164-177.
Beck, M. and Tews, E., "Practical Attacks Against WEP and WPA", In Proceedings of the 2nd ACM Conference on Wireless Network Security (WiSec '09), Zurich, CH, Mar. 16-18, 2009, pp. 79-85.
Bellard, F., "QEMU, a Fast and Portable Dynamic Translator", In Proceedings of USENIX Annual Technical Conference, Anaheim, CA, US, Apr. 10-15, 2005, pp. 41-46.
Bittau, A., et al., "The Final Nail in WEP's Coffin", In Proceedings of the 2006 IEEE Symposium on Security and Privacy (S&P '06), Berkeley, CA, US, May 21-24, 2006, pp. 386-400.
Bloom, B.H., "Space/Time Trade-Offs in Hash Coding with Allowable Errors", In Communications of the ACM, vol. 13, No. 7, Jul. 1970, pp. 422-426.
Bond, M. and Danezis, G., "A Pact with the Devil", In Proceedings of the New Security Paradigms Workshop (NSPW '06), Schloss Dagstuhl, DE, Sep. 19-22, 2006, pp. 77-83.
Borders, K., et al., "Siren: Catching Evasive Malware", In Proceedings of the IEEE Symposium on Security and Privacy (S&P '06), Oakland, CA, US, May 21-24, 2006, pp. 78-85.
Bowen, B.M., et al., "Automating the Injection of Believable Decoys to Detect Snooping", In Proceedings of the 3rd ACM Conference on Wireless Network Security (WiSec '10), Hoboken, NJ, US, Mar. 22-24, 2010, pp. 81-86.
Bowen, B.M., et al., "Designing Host and Network Sensors to Mitigate the Insider Threat", In IEEE Security & Privacy Magazine, vol. 7, No. 6, Nov./Dec. 2009, pp. 22-29.
Butler, J. and Sparks, S., "Spyware and Rootkits: The Future Convergence", In Login, vol. 29, No. 6, Dec. 2004, pp. 8-15.

CERT, "'Code Red' Worm Exploiting Buffer Overflow in IIS Indexing Service DLL", Technical Report, CERT Advisory CA-2001-19, Jul. 19, 2001, pp. 1-3, available at: http://www.cert.org/advisories/CA-2001-19.html.
CERT, "MS-SQL Server Worm", Technical Report, CERT Advisory CA-2003-04, Jan. 27, 2003, pp. 1-3, available at: http://www.cert.org/advisories/CA-2003-04.html.
CERT, "Nimda Worm", Technical Report, CERT Advisory CA-2001-26, Sep. 18, 2001, pp. 1-5, available at: http://www.cert.org/advisories/CA-2001-26.html.
CERT, "W32/Blaster Worm", Technical Report, CERT Advisory CA-2003-20, Aug. 14, 2003, pp. 1-3, available at: http://www.cert.org/advisories/CA-2003-20.html.
Chandrasekaran, M., et al., "SpyCon: Emulating User Activities to Detect Evasive Spyware", In Proceedings of the Performance, Computing, and Communications Conference (IPCCC '07), New Orleans, LA, US, Apr. 11-13, 2007, pp. 502-509.
Chen, P.M. and Noble, B.D., "When Virtual is Better Than Real", In Proceedings of the 8th Workshop on Hot Topics in Operating System (HotOS '01), Elmau/Oberbayern, DE, May 20-23, 2001, pp. 133-138.
Cheswick, B., "An Evening with Berferd in Which a Cracker is Lured, Endured, and Studied", AT&T Bell Laboratories, Jan. 7, 1991, pp. 1-11, available at: www.cheswick.com/ches/papers/berferd.pdf.
Chou, N., et al., "Client-Side Defense Against Web-Based Identity Theft", In Proceedings of the ISOC Symposium on Network and Distributed Systems Security (NDSS '04), San Diego, CA, US, Feb. 5-6, 2004, pp. 1-16.
Christodorescu, M. and Jha, S., "Static Analysis of Executables to Detect Malicious Patterns", In Proceedings of the 12th USENIX Security Symposium (SSYM '03), Washington, DC, US, Aug. 4-8, 2003, pp. 169-186.
Christodorescu, M. and Jha, S., "Testing Malware Detectors", In Proceedings of the ACM SIGSOFT International Symposium on Software Testing and Analysis (ISSTA '04), Boston, MA, US, Jul. 11-14, 2004, pp. 34-44.
Cover, T.M. and Hart, P.E., "Nearest Neighbor Pattern Classification", In IEEE Transactions on Information Theory, vol. 13, No. 1, Jan. 1967, pp. 21-27.
Cracknell, P., et al., "The Wireless Security Survey of New York City", Technical Report, RSA, The Security Division of EMC, Oct. 2008, pp. 1-9.
Cui, W., et al., "Protocol-Independent Adaptive Replay of Application Dialog", In Proceedings of the 13th Symposium on Network and Distributed System Security (NDSS '06), San Diego, CA, US, Feb. 2-3, 2006, pp. 1-15.
Cully, B., et al., "Remus: High Availability via Asynchronous Virtual Machine Replication", In Proceedings of the USENIX Symposium on Networked Systems Design and Implementation (NSDI '08), San Francisco, CA, US, Apr. 16-18, 2008, pp. 161-174.
Dagon, D., et al., "HoneyStat: Local Worm Detection Using Honeypots", In Proceedings of the 7th International Symposium on Recent Advances in Intrusion Detection (RAID '04), Sophia Antipolis, FR, Sep. 15-17, 2004, pp. 39-58.
Damashek, M., "Gauging Similarity with N-Grams: Language-Independent Categorization of Text", In Science, vol. 267, No. 5199, Feb. 10, 1995, pp. 843-848.
Dark Reading, "Researcher Uncovers Massive, Sophisticated Trojan Targeting Top Businesses", Darkreading, Jul. 29, 2009, pp. 1-2, available at: http://www.darkreading.com/database_security/security/privacy/showArticle.jhtml?articleID=218800077.
De Maesschalck, R., et al., "The Mahalanobis Distance", In Chemometrics and Intelligent Laboratory Systems, vol. 50, No. 1, Jan. 4, 2000, pp. 1-18.
Demers, A., et al., "Cayuga: A General Purpose Event Monitoring System", In Proceedings of the Third Biennial Conference on Innovative Data Systems Research (CIDR '07), Asilomar, CA, US, Jan. 7-10, 2007, pp. 412-422.
Detristan, T., et al., "Polymorphic Shellcode Engine Using Spectrum Analysis", In Phrack, vol. 61, Aug. 13, 2003, pp. 1-25, available at: http://www.phrack.org/issues.html?issue=61&id=9.

(56) References Cited

OTHER PUBLICATIONS

Dhamija, R., et al., "Why Phishing Works", In Proceedings of the 2006 Conference on Human Factors in Computing Systems (CHI '06), Montréal, QC, CA, Apr. 22-27, 2006, pp. 581-590.

Dovrolis, C., et al., "Packet-Dispersion Techniques and a Capacity-Estimation Methodology", In IEEE/ACM Transactions on Networking, vol. 12, No. 6, Dec. 2004, pp. 963-977.

Dubendorfer, T., et al., "Flow-Level Traffic Analysis of the Blaster and Sobig Worm Outbreaks in an Internet Backbone", In Proceedings of the Conference on Detection of Intrusions and Malware & Vulnerability Assessment (DIMVA '05), Vienna, AT, Jul. 7-8, 2005, pp. 103-122.

Egele, M., et al., "Dynamic Spyware Analysis", In Proceedings of the USENIX Annual Technical Conference, Santa Clara, CA, US, Jun. 17-22, 2007, pp. 233-246.

Frias-Martinez, V., et al., "Behavior-Based Network Access Control: A Proof-of-Concept", In the Proceedings of the 11th Information Security Conference (ISC '08), Taipei, TW, Sep. 15-18, 2008, pp. 175-190.

Friess, N. and Aycock, J., "Black Market Botnets", Technical Report TR 2007-873-25, University of Calgary, Jul. 2007, pp. 1-14.

Garfinkel, T. and Rosenblum, M., "A Virtual Machine Introspection Based Architecture for Intrusion Detection", In Proceedings of the 10th Network and Distributed System Security Symposium (NDSS '03), San Diego, CA, US, Feb. 6-7, 2003, pp. 191-206.

Garfinkel, T., et al., "Compatibility is Not Transparency: VMM Detection Myths and Realities", In Proceedings of the 11th USENIX Workshop on Hot Topics in Operating Systems (HotOS '07), San Diego, CA, US, May 7-9, 2007, pp. 1-6.

Gartner, "Gartner Survey Shows Phishing Attacks Escalated in 2007; More than $3 Billion Lost to These Attacks", Dec. 17, 2009, pp. 1-3, available at: http://www.gartner.com/it/page.jsp?id=565125.

Goel, S. and Bush, S.F., "Kolmogorov Complexity Estimates for Detection of Viruses in Biologically Inspired Security Systems: A Comparison with Traditional Approaches", In Complexity Journal, vol. 9, No. 2, Nov.-Dec. 2003, pp. 54-73.

Graham, R.D., "SideJacking with Hamster", Technical Report, Errata Security, Aug. 5, 2007, pp. 1-11, available at: http://erratasec.blogspot.com/2007/08/sidejacking-with-hamster_05.html.

Hall, M., et al., "The WEKA Data Mining Software: An Update", In ACM SIGKDD Explorations Newsletter, vol. 11, No. 1, Jun. 2009, pp. 10-18.

Higgins, K.J., "Up to 9 Percent of Machines in an Enterprise are Bot-Infected", Darkreading, Sep. 24, 2009, pp. 1-2, available at: http://www.darkreading.com/insiderthreat/security/client/showArticle.jhtml?articleID=220200118.

Hirschberg, D.S., "A Linear Space Algorithm for Computing Maximal Common Subsequences", In Communications of the ACM, vol. 18, No. 6, Jun. 1975, pp. 341-343.

Hoang, M., "Handling Today's Tough Security Threats", In Symantec Official Blog, Nov. 2, 2006, pp. 1-2, available at: http://www.symantec.com/connect/blogs/handling-todays-tough-security-threats-rootkits.

Holz, T., "A Short Visit to the Bot Zoo", In IEEE Security & Privacy, vol. 3, No. 3, May/Jun. 2005, pp. 76-79.

Holz, T., et al., "Learning More About the Underground Economy: A Case-Study of Keyloggers and Dropzones", In Proceedings of the 14th European Symposium on Research in Computer Security (ESORICS '09), Saint-Malo, FR, Sep. 21-23, 2009, pp. 1-18.

Hong, S.S. and Wu, S.F., "On Interactive Internet Traffic Replay", In Proceedings of the 8th International Symposium on Recent Advances in Intrusion Detection (RAID '05), Seattle, WA, US, Sep. 7-9, 2005, pp. 247-264.

Ilett, D., "Trojan Attacks Microsoft's Anti-Spyware", CNET News, Feb. 9, 2005, pp. 1-3, available at: http://news.cnet.com/Trojan-attacks-Microsofts-anti-spyware/2100-7349_3-5569429.html.

International Patent Application No. PCT/US2007/012811, filed May 31, 2007.

International Patent Application No. PCT/US2008/066623, filed Jun. 12, 2008.

International Preliminary Report on Patentability dated Dec. 3, 2008 in International Patent Application No. PCT/US2007/012811.

International Preliminary Report on Patentability dated Dec. 30, 2009 in International Patent Application No. PCT/US2008/066623.

International Search Report and Written Opinion of the International Searching Authority dated Feb. 13, 2009 in International Patent Application No. PCT/US2008/066623.

International Search Report in International Patent Application No. PCT/US2007/012811, filed May 31, 2007, mailed Jul. 17, 2008.

International Search Report in International Patent Application No. PCT/US2008/066623, filed Jun. 12, 2008, mailed Feb. 13, 2009.

Jagatic, T., et al., "Social Phishing", Technical Report, Indiana University, Dec. 12, 2005, pp. 1-10.

Jiang, X. and Wang, X., "'Out-of-the-Box' Monitoring of VM-Based High-Interaction Honeypots", In Proceedings of the 10th International Symposium on Recent Advances in Intrusion Detection (RAID '07), Gold Goast, AU, Sep. 5-7, 2007, pp. 198-218.

Jones, S.T., et al., "Antfarm: Tracking Processes in a Virtual Machine Environment", In Proceedings of the USENIX Annual Technical Conference, Boston, MA, US, May 30-Jun. 3, 2006, pp. 1-14.

Karim, M.E., et al., "Malware Phylogeny Generation using Permutations of Code", In Journal in Computer Virology, vol. 1, No. 1-2, Nov. 2005, pp. 13-23.

Killourhy, K.S. and Maxion, R.A., "Comparing Anomaly-Detection Algorithms for Keystroke Dynamics", In IEEE/IFIP International Conference on Dependable Systems & Networks (DSN '09), Lisbon, PT, Jun. 29-Jul. 2, 2009, pp. 125-134.

Klimt, B. and Yang, Y., "Introducing the Enron Corpus", In Proceedings of the 3rd Conference on Email and Anti-Spam (CEAS '06), Mountain View, CA, US, Jul. 27-28, 2006, pp. 1-2.

Kolesnikov, O., et al., "Advanced Polymorphic Worms: Evading IDS by Blending in with Normal Traffic", Technical Report GIT-CC-04-15, Georgia Institute of Technology, 2004 (month unknown), pp. 1-22.

Kravets, D., "From Riches to Prison: Hackers Rig Stock Prices", Wired Blog Network, Sep. 8, 2008, pp. 1-6, available at: www.wired.com/threatlevel/2008/09/from-riches-to/.

Krebs, B., "Web Fraud 2.0: Validating Your Stolen Goods", The Washington Post, Aug. 20, 2008, pp. 1-5, available at: http://voices.washingtonpost.com/securityfix/2008/08/web_fraud_20_try_before_you_bu.html.

Lee, W. and Xiang, D., "Information-Theoretic Measures for Anomaly Detection", In Proceedings of the IEEE Symposium on In Security and Privacy (S&P '01), Oakland, CA, US, May 14-16, 2001, pp. 130-143.

Li, M., et al., "WBest: a Bandwidth Estimation Tool for IEEE 802.11 Wireless Networks", In Proceedings of the 33rd IEEE Conference on Local Computer Networks (LCN '08), Montreal, QC, CA, Oct. 14-17, 2008, pp. 374-381.

Li, W.J., et al., "A Study of Malcode-Bearing Documents", In Proceedings of the 4th International Conference on Detection of Intrusions and Malware, and Vulnerability Assessment (DIMVA '07), Lucerne, CH, Jul. 12-13, 2007, pp. 231-250.

Li, W.J., et al., "Fileprints: Identifying File Types by N-Gram Analysis", In Proceedings of the 6th Annual IEEE SMC Information Assurance Workshop (IAW '05), West Point, NY, US, Jun. 15-17, 2005, pp. 64-71.

Lindahl, G., "MS Outlook to Unix Mailbox Conversion Mini Howto", Jan. 8, 2004, pp. 1-8, available at: http://tldp.org/HOWTO/pdf/Outlook-to-Unix-Mailbox.pdf.

Lippmann, R.P., et al., "Evaluating Intrusion Detection Systems: The 1998 DARPA Off-Line Intrusion Detection Evaluation", In Proceedings of the DARPA Information Survivability Conference and Exposition (DISCEX '00), vol. 2, Hilton Head, SC, US, Jan. 25-27, 2000, pp. 12-26.

McDaniel, M. and Hossain, H.M., "Content Based File Type Detection Algorithms", In Proceedings of the 36th Annual Hawaii International Conference on System Sciences (HICSS '03), Big Island, HI, US, Jan. 6-9, 2003, pp. 1-10.

McGlasson, L., "TJX Update: Breach Worse Than Reported", Technical Report, Bank Info Security, Oct. 26, 2007, pp. 1-4, available at: http://www.bankinfosecurity.com/tjx-update-breach-worse-than-reported-a-606.

(56) References Cited

OTHER PUBLICATIONS

McRae, C.M. and Vaughn, R.B., "Phighting the Phisher: Using Web Bugs and Honeytokens to Investigate the Source of Phishing Attacks", In Proceedings of the 40th Annual Hawaii International Conference on System Sciences (HICSS '07), Waikoloa, Big Island, HI, US, Jan. 3-6, 2007, pp. 1-7.
Medina, A., et al., "Traffic Matrix Estimation: Existing Techniques and New Directions", In Proceedings of the ACM SIGCOMM Computer Communication Review (SIGCOMM '02), Pittsburgh, PA, US, Aug. 19-23, 2002, pp. 161-174.
Messmer, E., "America's 10 Most Wanted Botnets", Network World, Jul. 22, 2009, pp. 1-3, available at: http://www.networkworld.com/news/2009/072209-botnets.html.
Michael J.B., et al., "Software Decoys: Intrusion Detection and Countermeasures", In Proceedings of the 2002 IEEE Workshop on Information Assurance (IAW '02), West Point, NY, US, Jun. 17-19, 2002, pp. 130-138.
Microsoft, "Microsoft Security Advisory 912840: Vulnerability in Graphics Rendering Engine Could Allow Remote Code Execution", Technical Report, Jan. 5, 2006, pp. 1-2, available at: http://www.microsoft.com/technet/security/advisory/912840.mspx.
Monrose, F. and Rubin, A., "Authentication via Keystroke Dynamics", In Proceedings of the 4th ACM Conference on Computer and Communications Security (CCS '97), Zurich, CH, Apr. 1-4, 1997, pp. 48-56.
Monterio Jr., V., "How Intrusion Detection Can Improve Software Decoy Applications", Master's Thesis, Naval Postgraduate School, Mar. 2003, pp. 1-69.
Moore, D., et al., "Code-Red: A Case Study on the Spread and Victims of an Internet Worm", In Proceedings of the 2nd Internet Measurement Workshop (IMW '02), Marseille, FR, Nov. 6-8, 2002, pp. 273-284.
Morse, A., "Google's Gmail Service Suffers Another Shutdown", Technical Report, Wall Street Journal, Mar. 11, 2009, pp. 1-4, available at: http://online.wsj.com/article/SB123673492963090721.html.
Moshchuk, A., et al., "A Crawler-Based Study of Spyware in the Web", In Proceedings of the ISOC Symposium on Network and Distributed System Security (NDSS '06), San Diego, CA, US, Feb. 2-3, 2006, pp. 1-17.
Naor, M. and Yung, M., "Universal One-Way Hash Functions and their Cryptographic Applications", In Proceedings of the 21st Annual ACM Symposium on Theory of Computing (STOC '89), Seattle, WA, US, May 14-17, 1989, pp. 33-43.
Noga, A.J., "A Visual Data Hash Method", Technical Report, Air Force Research Laboratory, Oct. 2004, pp. 1-19.
Notice of Allowance dated Apr. 29, 2013 in U.S. Appl. No. 12/982,984.
Office Action dated Feb. 23, 2012 in U.S. Appl. No. 12/565,394.
Office Action dated Mar. 5, 2013 in U.S. Appl. No. 12/565,394.
Office Action dated Mar. 7, 2014 in U.S. Appl. No. 13/166,723.
Office Action dated Mar. 28, 2012 in U.S. Appl. No. 12/302,774.
Office Action dated Apr. 3, 2014 in U.S. Appl. No. 12/565,394.
Office Action dated Apr. 22, 2009 in U.S. Appl. No. 12/302,774.
Office Action dated Jun. 22, 2015 in U.S. Appl. No. 13/965,619.
Office Action dated Jul. 7, 2014 in U.S. Appl. No. 13/965,619.
Office Action dated Jul. 10, 2015 in U.S. Appl. No. 14/339,245.
Office Action dated Jul. 17, 2013 in U.S. Appl. No. 13/166,723.
Office Action dated Aug. 16, 2012 in U.S. Appl. No. 12/565,394.
Office Action dated Oct. 11, 2013 in U.S. Appl. No. 12/565,394.
Office Action dated Oct. 16, 2012 in U.S. Appl. No. 12/982,984.
Office Action dated Nov. 7, 2013 in U.S. Appl. No. 12/302,774.
Office Action dated Nov. 15, 2012 in U.S. Appl. No. 12/302,774.
Office Action dated Dec. 16, 2014 in U.S. Appl. No. 13/166,723.
Office Action dated Jun. 5, 2015 in U.S. Appl. No. 14/642,401.
Oudot, L., "Wireless Honeypot Countermeasures", Technical Report, Security Focus, Feb. 13, 2004, pp. 1-23, available at: http://www.securityfocus.com/print/infocus/1761.
Packet Storm, "Antisniff", accessed May 17, 2012, pp. 1-2, available at: http://packetstormsecurity.org/sniffers/antisniff/.
Pappas, V., et al., "Crimeware Swindling Without Virtual Machines", In Proceedings of the 13th International Conference on Information Security (ISC '10), Boca Raton, FL, US, Oct. 25-28, 2010, pp. 196-202.
Pappas, V., et al., "Evaluation of Spyware Detection System Using Thin Client Computing", In Proceedings of the 13th International Conference on Information Security and Cryptology (ICISC '10), Seoul, KR, Dec. 1-3, 2010, pp. 222-232.
Pereira, J., "How Credit-Card Data Went out Wireless Door", In Wall Street Journal, May 4, 2007, pp. 1-4, available at: http://online.wsj.com/article/SB117824446226991797.html.
Petroni, Jr., N.L., et al., "Copilot-A Coprocessor-Based Kernel Runtime Integrity Monitor", In Proceedings of the 13th USENIX Security Symposium, San Diego, CA, US, Aug. 9-13, 2004, pp. 179-194.
Plummer, D. and Greenwood, W., "The History of Nuclear Weapon Safety Devices", In Proceedings of the 34th AIAA/ASME/SAE/ASEE Joint Propulsion Conference, Cleveland, OH, US, Jul. 13-15, 1998, pp. 1-8.
Provos, N., "A Virtual Honeypot Framework", In Proceedings of the 13th USENIX Security Symposium, San Diego, CA, US, Aug. 9-13, 2004, pp. 1-14.
Provos, N., "Defeating Statistical Steganalysis", last accessed Dec. 2001, pp. 1-113, available at: http://niels.xtdnet.nl/stego/.
Richardson, R., "CSI Computer Crime & Security Survey", 2008 (month unknown), pp. 1-30, available at: http://gocsi.com/SurveyArchive.
Rivest, R.L., "Chaffing and Winnowing: Confidentiality without Encryption", In CryptoBytes, Mar. 18, 1998, pp. 12-17.
Sailer, R., et al., "Design and Implementation of a TCG-based Integrity Measurement Architecture", In Proceedings of the 13th USENIX Security Symposium, San Diego, CA, US, Aug. 9-13, 2004, pp. 223-238.
Salem, M.B., et al., "A Survey of Insider Attack Detection Research", In Insider Attack and Cyber Security: Beyond the Hacker, Springer, Apr. 2008, pp. 69-90.
Salem, M.B., et al., "Modeling User Search-Behavior for Masquerade Detection", In Proceedings of the 14th International Symposium on Recent Advances in Intrusion Detection, Menlo Park, CA, US, Sep. 20-21, 2011, pp. 181-200.
Sanfilippo, S., "Hping—Active Network Security Tool", last accessed May 18, 2012, pp. 1-51, available at: http://www.hping.org.
Saroiu, S., et al., "Measurement and Analysis of Spyware in a University Environment", In Proceedings of the 1st Symposium on Networked Systems Design and Implementation (NSDI '04), San Francisco, CA, US, Mar. 29-31, 2004, pp. 141-153.
Schultz, M.G., et al., "Data Mining Methods for Detection of New Malicious Executables", In Proceedings of the IEEE Symposium on Security and Privacy (S&P '01), Oakland, CA, US, May 14-16, 2001, pp. 38-49.
Smith, S., "Magic Boxes and Boots: Security in Hardware", In IEEE Computer, vol. 37, No. 10, Oct. 2004, pp. 106-109.
Sommers, J. and Barford, P., "Self-Configuring Network Traffic Generation", In Proceedings of the 4th ACM SIGCOMM Conference on Internet Measurement (IMC '04), Taormina, Sicily, IT, Oct. 25-27, 2004, pp. 68-81.
Song, Y., et al., "On the Infeasibility of Modeling Polymorphic Shellcode", In Proceedings of the 14th ACM Conference on Computer and Communications Security (CCS '07), Alexandria, VA, US, Oct. 29-Nov. 2, 2007, pp. 541-551.
Spitzner, L., "Honeytokens: The Other Honeypot", Technical Report, Security Focus, Jul. 17, 2003, pp. 1-5, available at: http://www.symantec.com/connect/articles/honeytokens-other-honeypot.
Spray, S. and Cooper, A., "The Unique Signal Concept for Detonation Safety in Nuclear Devices", Technical Report UC-706, Sandia National Laboratories, Dec. 1992, pp. 1-73.
Srivastava, A. and Giffin, J., "Tamper-Resistant, Application-Aware Blocking of Malicious Network Connections", In Proceedings of the 11th International Symposium on Recent Advances in Intrusion Detection (RAID '08), Cambridge, MA, US, Sep. 15-17, 2008, pp. 39-58.

(56) References Cited

OTHER PUBLICATIONS

Ståhlberg, M., "The Trojan Money Spinner", Technical Report, F-Secure Corporation, Sep. 2007, pp. 1-7, available at: http://www.f-secure.com/weblog/archives/VB2007_TheTrojanMoneySpinner.pdf.

Stolfo, S.J., et al., "Fileprint Analysis for Malware Detection", Technical Report, Columbia University, Jun. 2005, pp. 1-12.

Stolfo, S.J., et al., "Towards Stealthy Malware Detection", Malware Detection, Advances in Information Security, vol. 27, 2007 (month unknown), pp. 231-249.

Stoll, C., "Stalking the Wily Hacker", In Communications of the ACM, vol. 31, No. 5, May 1988, pp. 484-497.

Symantec, "Global Internet Security Threat Report: Trends for Jul.-Dec. 2007", Apr. 2008, pp. 1-97, available at:http://eval.symantec.com/mktginfo/enterprise/white_papers/b-whitepaper_internet_security_threat_report_xiii_04-2008.en-us.pdf.

Szor, P. and Ferrie, P., "Hunting for Metamorphic", Technical Report, Symantec Corporation, Jun. 2003, pp. 1-23.

The Honeynet Project, "Know Your Enemy: Sebek, A Kernel Based Data Capture Tool", Technical Report, Nov. 17, 2003, pp. 1-21, available at: http://old.honeynet.org/papers/sebek.pdf.

Trusteer, "Measuring the In-the-Wild Effectiveness of Antivirus Against Zeus", Technical Report, Sep. 14, 2009, pp. 1-6, available at: www.trusteer.com/files/Zeus_and_Antivirus.pdf.

Tsow, A., et al., "Warkitting: The Drive-by Subversion of Wireless Home Routers", In Journal of Digital Forensic Practice, vol. 1, No. 3, Sep. 2006, pp. 179-192.

Turing, A.M., "Computing Machinery and Intelligence", In Mind, New Series, vol. 59, No. 236, Oct. 1950, pp. 433-460.

Tygar, J.D. and Yee, B., "DYAD: A System for Using Physically Secure Coprocessors", Technical Report CMU-CS-91-140R, Carnegie Mellon University, May 1991, pp. 1-36.

U.S. Appl. No. 12/302,774, filed May 27, 2009.
U.S. Appl. No. 12/565,394, filed Sep. 23, 2009.
U.S. Appl. No. 12/982,984, filed Dec. 31, 2010.
U.S. Appl. No. 13/166,723, filed Jun. 22, 2011.
U.S. Appl. No. 60/809,898, filed May 31, 2006.
U.S. Appl. No. 60/934,307, filed Jun. 12, 2007.
U.S. Appl. No. 61/044,376, filed Apr. 11, 2008.
U.S. Appl. No. 61/099,526, filed Sep. 23, 2008.
U.S. Appl. No. 61/165,634, filed Apr. 1, 2009.
U.S. Appl. No. 61/291,712, filed Dec. 31, 2009.
U.S. Appl. No. 61/357,481, filed Jun. 22, 2010.

Vandat, A., et al., "Scalability and Accuracy in a Large-Scale Network Emulator", In Proceedings of the 5th Symposium on Operating Systems Design and Implementation (OSDI '02), Boston, MA, US, Dec. 9, 2002, pp. 261-284.

Vargiya, R. and Chan, P., "Boundary Detection in Tokenizing Network Application Payload for Anomaly Detection", In Proceedings of the ICDM Workshop on Data Mining for Computer Security (DMSEC '03), Melbourne, FL, US, Nov. 19, 2003, pp. 1-15.

Vasudevan, A. and Yerraballi, R., "Cobra: Fine-Grained Malware Analysis using Stealth Localized-Executions", In Proceedings of the IEEE Symposium on Security & Privacy (S&P '06), Berkeley, CA, US, May 21-24, 2006, pp. 264-279.

Vishwanath, K.V. and Vandat, A., "Realistic and Responsive Network Traffic Generation", In Proceedings of the ACM Conference on Applications, Technologies, Architectures, and Protocols for Computer Communications (SIGCOMM '06), vol. 36, No. 4, Pisa, IT, Sep. 11-15, 2006, pp. 111-122.

Walsh, T.J. and Kuhn, D.R., "Challenges in Securing Voice over IP", In IEEE Security & Privacy Magazine, vol. 3, No. 3, May/Jun. 2005, pp. 44-49.

Wang, K. and Stolfo, S.J., "Anomalous Payload-Based Network Intrusion Detection", In Proceedings of the 7th International Symposium on Recent Advances in Intrusion Detection (RAID '04), Sophia Antipolis, FR, Sep. 15-17, 2004, pp. 203-222.

Wang, K. et al., "Anomalous Payload-Based Worm Detection and Signature Generation", In Proceedings of the 8th International Symposium on Recent Advances in Intrusion Detection (RAID '05), Seattle, WA, US, Sep. 7-9, 2005, pp. 227-246.

Wang, K., et al., "Anagram: A Content Anomaly Detector Resistant to Mimicry Attack", In Proceedings of the International Conference on Recent Advanced in Intrusion Detection (RAID '06), Hamburg, DE, Sep. 20-22, 2006, pp. 226-248.

Wang, Y.M., et al., "Automated Web Patrol with Strider HoneyMonkeys: Finding Web Sites That Exploit Browser Vulnerabilities", In Proceedings of the 13th Annual Network and Distributed System Security Symposium (NDSS '06), San Diego, CA, US, Feb. 10-13, 2006, pp. 1-10.

Watson, D., et al., "Know Your Enemy: Phishing", Technical Report, May 16, 2005, pp. 1-87, available at: http://www.honeynet.org/papers/phishing/.

Willems, C., et al., "Toward Automated Dynamic Malware Analysis Using CWSandbox", In IEEE Security & Privacy, vol. 5, No. 2, Mar./Apr. 2007, pp. 32-39.

Written Opinion dated Jul. 17, 2008 in International Patent Application No. PCT/US2007/012811.

Written Opinion in International Patent Application No. PCT/US2008/066623, filed Jun. 12, 2008, mailed Feb. 13, 2009.

Yang, J., et al., "Automatically Generating Malicious Disks using Symbolic Execution", In Proceedings of the IEEE Symposium on Security & Privacy (S&P '06), Berkeley, CA, USA, May 21-24, 2006, pp. 243-257.

Ye, N., "A Markov Chain Model of Temporal Behavior for Anomaly Detection", In Proceedings of the IEEE Workshop on Information Assurance and Security (IAS '00), West Point, NY, US, Jun. 6-7, 2000, pp. 171-174.

Ye, Z., et al., "Trusted Paths for Browsers", In ACM Transactions on Information and System Security (TISSEC '05), vol. 8, No. 2, May 2005, pp. 153-186.

Yee, B., "Using Secure Coprocessors", PhD Thesis, Carnegie Mellon University, May 1994, pp. 1-91.

Yegneswaran, V., et al., "On the Design and Use of Internet Sinks for Network Abuse Monitoring", In Proceedings of the 7th International Symposium on Recent Advances in Intrusion Detection (RAID '04), Sophia Antipolis, FR, Sep. 15-17, 2004, pp. 146-165.

Yin, H., et al., "Panorama: Capturing System-Wide Information Flow for Malware Detection and Analysis", In Proceedings of the 14th ACM Conference on Computer and Communications Security (CCS '07), Alexandria, VA, US, Oct. 29-Nov. 2, 2007, pp. 116-127.

Yuill, J., et al., "Honeyfiles: Deceptive Files for Intrusion Detection", In Proceedings of the 5th Annual IEEE Workshop on Information Assurance, West Point, NY, US, Jun. 10-11, 2004, pp. 116-122.

Yuill, J., et al., "Using Deception to Hide Things from Hackers: Processes, Principles, and Techniques", In Journal of Information Warfare, vol. 5, No. 3, Nov. 2006, pp. 26-40.

Office Action dated Dec. 8, 2015 in U.S. Appl. No. 13/166,723.
Office Action dated Dec. 9, 2015 in U.S. Appl. No. 13/965,619.
Office Action dated Dec. 9, 2015 in U.S. Appl. No. 14/642,401.

* cited by examiner

FIG. 3

METHODS, SYSTEMS, AND MEDIA FOR MASQUERADE ATTACK DETECTION BY MONITORING COMPUTER USER BEHAVIOR

CROSS REFERENCE TO RELATED APPLICATIONS

This application is a continuation of U.S. patent application Ser. No. 12/628,587, filed Dec. 1, 2009, which claims the benefit of U.S. Provisional Patent Application No. 61/119,294, filed Dec. 2, 2008 and U.S. Provisional Application No. 61/119,540, filed Dec. 3, 2008, which are hereby incorporated by reference herein in their entireties.

STATEMENT REGARDING FEDERALLY SPONSORED RESEARCH OR DEVELOPMENT

The invention was made with government support under Grant No. 60NANB1D0127 awarded by the U.S. Department of Homeland Security through the Institute for Information Infrastructure Protection (I3P) and under Grant No. W911NF-06-1-0151-49626-CI awarded by the Army Research Office (ARO). The government has certain rights in the invention.

TECHNICAL FIELD

The disclosed subject matter relates to methods, systems, and media for masquerade attack detection by monitoring computer user behavior.

BACKGROUND

Much research in computer security has focused on approaches for preventing unauthorized and illegitimate access to systems and information. However, one of the most damaging malicious activities is the result of internal misuse within an organization. This may be because much of the attention has been focused on preventative measures against computer viruses, worms, trojans, hackers, rootkits, spyware, key recovery attacks, denial-of-service attacks, malicious software (or malware), probes, etc. such that far less attention has been focused inward.

Insider threats generally include masqueraders and/or traitors. Masqueraders generally include attackers that impersonate another inside user, while traitors generally include inside attackers that use their own legitimate credentials to attain illegitimate goals. For example, identity theft in financial transaction systems is one example of a masquerade attack. Upon stealing a bank customer's commercial identity (e.g., their credit card or account information), a masquerader presents those credentials for the malicious purpose of using the customer's credit line to steal money. In another example, a disgruntled insider employee is an example of a traitor, where the traitor generally has full knowledge of the systems he or she routinely uses and the security policies in force and uses his or her knowledge and access to conduct unauthorized activities. In yet another example, the disgruntled insider employee can act as a traitor and a masquerader upon stealing the identity of another employee within the organization.

In addition, some external attackers can become inside attackers when, for example, an external attacker gains internal network access. For example, external attackers can gain access to an internal network with the use of spyware or rootkits. Such software can be easily installed on computer systems from physical or digital media (e.g., email, downloads, etc.) and can provide an attacker with administrator or "root" access on a machine along with the capability of gathering sensitive data. In particular, the attacker can snoop or eavesdrop on a computer or a network, download and exfiltrate data, steal assets and information, destroy critical assets and information, and/or modify information. Rootkits have the ability to conceal themselves and elude detection, especially when the rootkit is previously unknown, as is the case with zero-day attacks. An external attacker that manages to install a rootkit internally in effect becomes an insider, thereby multiplying the ability to inflict harm.

Current detection approaches generally monitor command line calls issued by users, system calls for unusual application use or events, database or file accesses, and the organization policy management rules and compliance logs. For example, one particular detection approach detects malicious insider activities by specifically monitoring violations of a "Need-to-Know" policy. Another approach builds an adaptive command line interface. However, these approaches failed to reveal or clarify the user's intent when issuing commands or running processes. In addition, these detection approaches produce results with unacceptable false positive rates.

There is therefore a need in the art for approaches for detecting masquerade attacks by monitoring computer user behavior. Accordingly, it is desirable to provide methods, systems and media that overcome these and other deficiencies of the prior art.

SUMMARY

In accordance with various embodiments, mechanisms for detecting masquerade attacks by monitoring computer user behavior are provided.

Insider attacks generally include attacks from traitors and attacks from masqueraders that have already obtained credentials to access a computing environment. A traitor can be a legitimate user within an organization that has been granted access to systems and other information resources, but whose actions are counter to policy and whose goal is to negatively affect confidentiality, integrity, or availability of some information asset. A masquerader can be an attacker who succeeds in stealing a legitimate user's identity and impersonates the legitimate user for malicious purposes. For example, once a masquerader steals a bank customer's commercial identity including credit card and/or account information, the masquerader presents that information for the malicious purpose of using the customer's credit line to steal money. Inside attackers, traitors, and masqueraders are sometimes referred to herein as "masquerader" or "attacker."

However, the masquerader is generally unlikely to know how the victim computer user behaves when using a file system. For example, each individual computer user generally knows his or her own file system well enough to search in a limited, targeted, and unique fashion in order to find information germane to the current task. In another example, some individual computer users initiate the same or similar commands each time they log in to set their environment before using it—e.g., initiate some set of applications, such as read e-mail, open a web browser, and/or start a chat session. Masqueraders, on the other hand, generally do not know the user's file system and/or the layout of the user's desktop. As such, masqueraders generally search more extensively and broadly in a manner that is different from the victim user being impersonated. For example, a masquerader is likely to engage in extensive search activities since the masquerader may be unfamiliar with the system local resources or the masquerader may be exploring the file system prior to launching an attack.

In some embodiments, masquerade detection mechanisms are provided for monitoring a user's actions and determining whether current user actions are consistent with the user's historical behavior. For example, these mechanisms create one or more models of the behavior and intent of a particular user and determine whether the current user actions deviate from the one or more models. In another example, user actions (e.g., user commands, Windows applications, registry-based activities, DLL activities, etc.) are classified into categories allowing models to more easily detect patterns of behavior that are indicative of user intent. In a more particular example, a behavior related to search activities can be modeled to detect unusual amounts of search activities on a file system, which can be an indication that a masquerader has gained entry to the file system. As such, a search category for the particular user can be modeled.

In some embodiments, these masquerade detection mechanisms can include traps that can be used to confuse, deceive, and/or detect nefarious inside attackers that attempt to exfiltrate and/or use information. These traps use decoy information (sometimes referred to herein as "bait information," "bait traffic," "decoy media," or "decoy documents") to attract, deceive, and/or confuse attackers. For example, large amounts of decoy information can be generated and inserted into the network flows and large amount of decoy documents, or documents containing decoy information, can be generated and placed within a file system to lure potential attackers. In another example, decoy documents can be generated that are machine-generated documents containing content to entice an inside attacker into stealing bogus information. Among other things, decoy information can be used to reduce the level of system knowledge of an attacker, entice the attacker to perform actions that reveal their presence and/or identities, and uncover and track the unauthorized activities of the attacker.

It should be noted that files containing decoy information (e.g., a decoy password file, a file with bogus credit card information, etc.) can be used to reduce and/or eliminate false positives generated by detectors using the above-mentioned masquerade detection model. If the user accessed a file containing decoy information and performed abnormal behavior prior to or concurrently with accessing the decoy file, a detector or a sensor can use this information to determine that a masquerade attack is likely occurring. The masquerade detection model can be used to reduce and/or eliminate false positives generated by detectors that monitor decoy files.

Accordingly, masquerade detections mechanisms are provided that create and use a model of the computer user's behavior to determine whether at least one of the current user actions is deemed abnormal and that detect whether at least one of the current user actions includes accessing, transmitting, opening, executing, and/or misusing decoy information on the file system.

In some embodiments, a method for detecting masquerade attacks is provided, the method comprising: monitoring a first plurality of user actions and access of decoy information in a computing environment; generating a user intent model for a category that includes at least one of the first plurality of user actions; monitoring a second plurality of user actions; comparing the second plurality of user actions with the user intent model by determining deviation from the generated user intent model; identifying whether the second plurality of user actions is a masquerade attack based at least in part on the comparison; and generating an alert in response to identifying that the second plurality of user actions is the masquerade attack and in response to determining that the second plurality of user actions includes accessing the decoy information in the computing environment.

In some embodiments, the detection is performed using a host-based anomaly sensor. The host-based sensor can, for example, continuously monitor user behavior and detect significant behavior differences or changes, which can be indicative of a security breach or malicious intent. The host-based sensor can also continuously monitor whether a file containing decoy information has been accessed.

In some embodiments, the user actions are classified into contextual categories and models of user intent are generated for one or more categories. These categories can be selected for modeling based on, for example, operating environment, user, etc.

In accordance with some embodiments, a system for detecting masquerade attacks is provided, the system comprising a processor that: monitors a first plurality of user actions and access of decoy information in a computing environment; generates a user intent model for a category that includes at least one of the first plurality of user actions; monitors a second plurality of user actions; compares the second plurality of user actions with the user intent model by determining deviation from the generated user intent model; identifies whether the second plurality of user actions is a masquerade attack based at least in part on the comparison; and generates an alert in response to identifying that the second plurality of user actions is the masquerade attack and in response to determining that the second plurality of user actions includes accessing the decoy information in the computing environment.

In accordance with some embodiments, a non-transitory computer-readable medium containing computer-executable instructions that, when executed by a processor, cause the processor to perform a method for detecting masquerade attacks is provided. The method comprises: monitoring a first plurality of user actions and access of decoy information in a computing environment; generating a user intent model for a category that includes at least one of the first plurality of user actions; monitoring a second plurality of user actions; comparing the second plurality of user actions with the user intent model by determining deviation from the generated user intent model; identifying whether the second plurality of user actions is a masquerade attack based at least in part on the comparison; and generating an alert in response to identifying that the second plurality of user actions is the masquerade attack and in response to determining that the second plurality of user actions includes accessing the decoy information in the computing environment.

In accordance with some embodiments, a method for detecting masquerade attacks is provided, the method comprising: monitoring, using a hardware processor, a first plurality of user actions in a computing environment; generating a user intent model based on the first plurality of user actions; monitoring a second plurality of user actions in the computing environment; determining whether at least one of the second plurality of user actions deviates from the generated user intent model; determining whether the second plurality of user actions include performing an action on a file in the computing environment that contains decoy information in response to determining that at least one of the second plurality of user actions deviates from the generated user intent model; and generating an alert in response to determining that the second plurality of user actions include performing an action on a file in the computing environment that contains decoy information.

In accordance with some embodiments, a system for detecting masquerade attacks is provided, the system comprising: at least one hardware processor that is configured to: monitor a first plurality of user actions in a computing environment; generate a user intent model based on the first plurality of user actions; monitor a second plurality of user actions in the computing environment; determine whether at least one of the second plurality of user actions deviates from the generated user intent model; determine whether the second plurality of user actions include performing an action on a file in the computing environment that contains decoy information in response to determining that at least one of the second plurality of user actions deviates from the generated user intent model; and generate an alert in response to determining that the second plurality of user actions include performing an action on a file in the computing environment that contains decoy information.

In accordance with some embodiments, a non-transitory computer-readable medium containing computer-executable instructions that, when executed by a processor, cause the processor to perform a method for detecting masquerade attacks is provided. The method comprises: monitoring a first plurality of user actions in a computing environment; generating a user intent model based on the first plurality of user actions; monitoring a second plurality of user actions in the computing environment; determining whether at least one of the second plurality of user actions deviates from the generated user intent model; determining whether the second plurality of user actions include performing an action on a file in the computing environment that contains decoy information in response to determining that at least one of the second plurality of user actions deviates from the generated user intent model; and generating an alert in response to determining that the second plurality of user actions include performing an action on a file in the computing environment that contains decoy information.

BRIEF DESCRIPTION OF THE DRAWINGS

FIG. 3 is a diagram showing an example of a registry access sensor monitoring a user computing environment in accordance with some embodiments of the disclosed subject matter.

DETAILED DESCRIPTION

Figure 1:
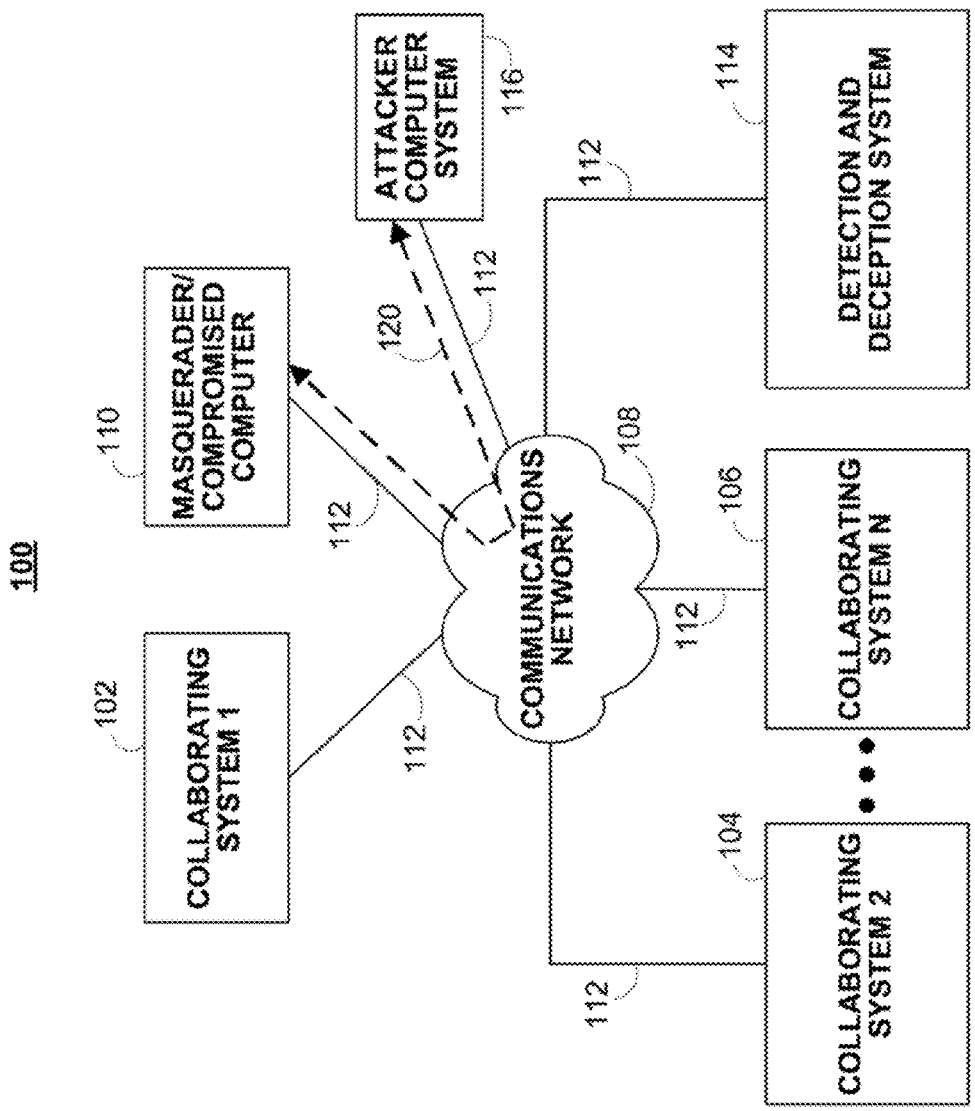
FIG. 1 is a diagram of a system suitable for implementing an application that detects masquerade attacks in accordance with some embodiments of the disclosed subject matter.

In accordance with various embodiments, mechanisms for detecting masquerade attacks by monitoring computer user behavior are provided.

Insider attacks generally include attacks from traitors and attacks from masqueraders that have already obtained credentials to access a computing environment. A traitor can be a legitimate user within an organization that has been granted access to systems and other information resources, but whose actions are counter to policy and whose goal is to negatively affect confidentiality, integrity, or availability of some information asset. A masquerader can be an attacker who succeeds in stealing a legitimate user's identity and impersonates the legitimate user for malicious purposes. For example, once a masquerader steals a bank customer's commercial identity including credit card and/or account information, the masquerader presents that information for the malicious purpose of using the customer's credit line to steal money. Inside attackers, traitors, and masqueraders are sometimes referred to herein as "masquerader" or "attacker."

However, the masquerader is generally unlikely to know how the victim computer user behaves when using a file system. For example, each individual computer user generally knows his or her own file system well enough to search in a limited, targeted, and unique fashion in order to find information germane to the current task. In another example, some individual computer users initiate the same or similar commands each time they log in to set their environment before using it—e.g., initiate some set of applications, such as read e-mail, open a web browser, and/or start a chat session. Masqueraders, on the other hand, generally do not know the user's file system and/or the layout of the user's desktop. As such, masqueraders generally search more extensively and broadly in a manner that is different from the victim user being impersonated. For example, a masquerader is likely to engage in extensive search activities since the masquerader may be unfamiliar with the system local resources or the masquerader may be exploring the file system prior to launching an attack.

In some embodiments, masquerade detection mechanisms are provided for monitoring a user's actions and determining whether current user actions are consistent with the user's historical behavior. For example, these mechanisms create one or more models of the behavior and intent of a particular user and determine whether the current user actions deviate from the one or more models. In another example, user actions (e.g., user commands, Windows applications, registry-based activities, DLL activities, etc.) are classified into categories allowing models to more easily detect patterns of behavior that are indicative of user intent. In a more particular example, a behavior related to search activities can be modeled to detect unusual amounts of search activities on a file system, which can be an indication that a masquerader has gained entry to the file system. As such, a search category for the particular user can be modeled.

In some embodiments, these masquerade detection mechanisms can include traps that can be used to confuse, deceive, and/or detect nefarious inside attackers that attempt to exfiltrate and/or use information. These traps use decoy information (sometimes referred to herein as "bait information," "bait traffic," "decoy media", or "decoy documents") to attract, deceive, and/or confuse attackers. For example, large amounts of decoy information can be generated and inserted into the network flows and large amount of decoy documents, or documents containing decoy information, can be generated and placed within a file system to lure potential attackers. In another example, decoy documents can be generated that are machine-generated documents containing content to entice an inside attacker into stealing bogus information. Among other things, decoy information can be used to reduce the level of system knowledge of an attacker, entice the attacker to perform actions that reveal their presence and/or identities, and uncover and track the unauthorized activities of the attacker.

It should be noted that files containing decoy information (e.g., a decoy password file, a file with bogus credit card information, etc.) can be used to reduce and/or eliminate false positives generated by detectors using the above-mentioned masquerade detection model. If the user accessed a file containing decoy information and performed abnormal behavior prior to or concurrently with accessing the decoy file, a detector or a sensor can use this information to determine that a masquerade attack is likely occurring. The masquerade detection model can be used to reduce and/or eliminate false positives generated by detectors that monitor decoy files.

Accordingly, masquerade detections mechanisms are provided that create and use a model of the computer user's behavior to determine whether at least one of the current user actions is deemed abnormal and that detect whether at least one of the current user actions includes accessing, transmitting, opening, executing, and/or misusing decoy information on the file system.

These mechanisms can be used in a variety of applications. For example, a host agent (e.g., an ActiveX control, a Javascript control, etc.) can insert and monitor decoy password information with an embedded active beacon among data in Microsoft Outlook (e.g., in the address book, in the notes section, etc.), while also generating models of normal user behavior and monitoring current user actions to determine whether a deviation from those models has occurred.

Turning to FIG. 1, an example of a system 100 in which the masquerade attack detection mechanisms can be implemented. As illustrated, system 100 includes multiple collaborating computer systems 102, 104, and 106, a communication network 108, a masquerader/compromised computer 110, communication links 112, detection and deception system 114, and an attacker computer system 116.

Collaborating systems 102, 104, and 106 can be systems owned, operated, and/or used by universities, businesses, governments, non-profit organizations, families, individuals, and/or any other suitable person and/or entity. Collaborating systems 102, 104, and 106 can include any number of user computers, servers, firewalls, routers, switches, gateways, wireless networks, wired networks, intrusion detection systems, and any other suitable devices. Collaborating systems 102, 104, and 106 can include one or more processors, such as a general-purpose computer, a special-purpose computer, a digital processing device, a server, a workstation, and/or various other suitable devices. Collaborating systems 102, 104, and 106 can run programs, such as operating systems (OS), software applications, a library of functions and/or procedures, background daemon processes, and/or various other suitable programs. In some embodiments, collaborating systems 102, 104, and 106 can support one or more virtual machines. Any number (including only one) of collaborating systems 102, 104, and 106 can be present in system 100, and collaborating systems 102, 104, and 106 can be identical or different.

Communication network 108 can be any suitable network for facilitating communication among computers, servers, etc. For example, communication network 108 can include private computer networks, public computer networks (such as the Internet), telephone communication systems, cable television systems, satellite communication systems, wireless communication systems, any other suitable networks or systems, and/or any combination of such networks and/or systems.

Generally speaking, a user of masquerader/compromised computer 110 is a masquerader or an inside attacker that legitimately has access to communications network 108 and/or one or more systems 102, 104, and 106, but uses his or her access to attain illegitimate goals. For example, a user of masquerader/compromised computer 110 can be a traitor that uses his or her own legitimate credentials to gain access to communications network 108 and/or one or more systems 102, 104, and 106, but uses his or her access to attain illegitimate goals. In another example, a user of masquerader/compromised computer 110 can be a masquerader that impersonates another inside user. In addition, masquerader/compromised computer 110 can be any computer, server, or other suitable device for launching a computer threat, such as a virus, worm, trojan, rootkit, spyware, key recovery attack, denial-of-service attack, malware, probe, etc.

It should be noted that, in some embodiments, an external attacker can become an inside attacker when the external attacker obtains internal network access. For example, using spyware or rootkits, external attackers can gain access to communications network 108. Such software can easily be installed on computer systems from physical or digital media (e.g., email, downloads, etc.) that provides an external attacker with administrator or "root" access on a machine along with the capability of gathering sensitive data. The external attacker can also snoop or eavesdrop on one or more systems 102, 104, and 106 or communications network 108, download and exfiltrate data, steal assets and information, destroy critical assets and information, and/or modify information. Rootkits have the ability to conceal themselves and elude detection, especially when the rootkit is previously unknown, as is the case with zero-day attacks. An external attacker that manages to install rootkits internally in effect becomes an insider, thereby multiplying the ability to inflict harm.

In some embodiments, the owner of masquerader/compromised computer 110 may not be aware of what operations masquerader/compromised computer 110 is performing or may not be in control of masquerader/compromised computer 110. Masquerader/compromised computer 110 can be acting under the control of another computer (e.g., attacking computer system 116) or autonomously based upon a previous computer attack which infected computer 110 with a virus, worm, trojan, spyware, malware, probe, etc. For example, some malware can passively collect information that passes through masquerader/compromised computer 110. In another example, some malware can take advantage of trusted relationships between masquerader/compromised computer 110 and other systems 102, 104, and 106 to expand network access by infecting other systems. In yet another example, some malware can communicate with attacking computer system 116 through an exfiltration channel 120 to transmit confidential information (e.g., IP addresses, passwords, credit card numbers, etc.).

It should be noted that malicious code can be injected into an object that appears as an icon in a document. In response to manually selecting the icon, the malicious code can launch an attack against a third-party vulnerable application. Malicious code can also be embedded in a document, where the malicious code does not execute automatically. Rather, the malicious code lies dormant in the file store of the environment awaiting a future attack that extracts the hidden malicious code.

Alternatively, in some embodiments, masquerader/compromised computer 110 and/or attacking computer system 116 can be operated by an individual or organization with nefarious intent. For example, with the use of malicious code and/or exfiltration channel 120, a user of masquerader/compromised computer 110 or a user of attacking computer system 116 can perform can perform unauthorized activities (e.g., exfiltrate data without the use of channel 120, steal information from one of the collaborating systems 102, 104, and 106), etc.

It should be noted that any number of masquerader/compromised computers 110 and attacking computer systems 116 can be present in system 100, but only one is shown in FIG. 1 to avoid overcomplicating the drawing.

More particularly, for example, each of the one or more collaborating or client computers 102, 104, and 106, masquerader/compromised computer 110, detection and deception system 114, and attacking computer system 116, can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, collaborating system 102 can be implemented as a personal computer, a personal data assistant (PDA), a portable email device, a multimedia terminal, a mobile telephone, a set-top box, a television, etc.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Referring back to FIG. 1, communication links 112 can be any suitable mechanism for connecting collaborating systems 102, 104, 106, masquerader/compromised computer 110, deception system 114, and attacking computer system 116 to communication network 108. Links 112 can be any suitable wired or wireless communication link, such as a T1 or T3 connection, a cable modem connection, a digital subscriber line connection, a Wi-Fi or 802.11(a), (b), (g), or (n) connection, a dial-up connection, and/or any other suitable communication link. Alternatively, communication links 112 can be omitted from system 100 when appropriate, in which case systems 102, 104, and/or 106, computer 110, and/or deception system 114 can be connected directly to communication network 108.

In some embodiments, detection and deception system 114 can be any computer, server, router, or other suitable device for generating models of normal user behavior and intent, monitoring user behavior in system 110, and modeling, generating, inserting, distributing, and/or managing decoy information into system 100. Similar to collaborating systems 102, 104, and 106, detection and deception system 114 can run programs, such as operating systems (OS), software applications, a library of functions and/or procedures, background daemon processes, and/or various other suitable programs. In some embodiments, detection and deception system 114 can support one or more virtual machines.

For example, detection and deception system 114 can include a decoy information broadcaster to inject decoy traffic information into communications network 108. In another example, detection and deception system 114 can be a designated server or a dedicated workstation that analyzes the information, events, and network flow in system 100, generates models of user behavior and decoy information based on that analysis, and inserts the deception information into the system 100. In yet another example, deception system can operate in connection with a host-based security application, such as Symantec Antivirus. In yet another example, detection and deception system 114 can be multiple servers or workstations that simulate the information, events, and traffic between collaborating systems 102, 104, and 106.

Figure 2:
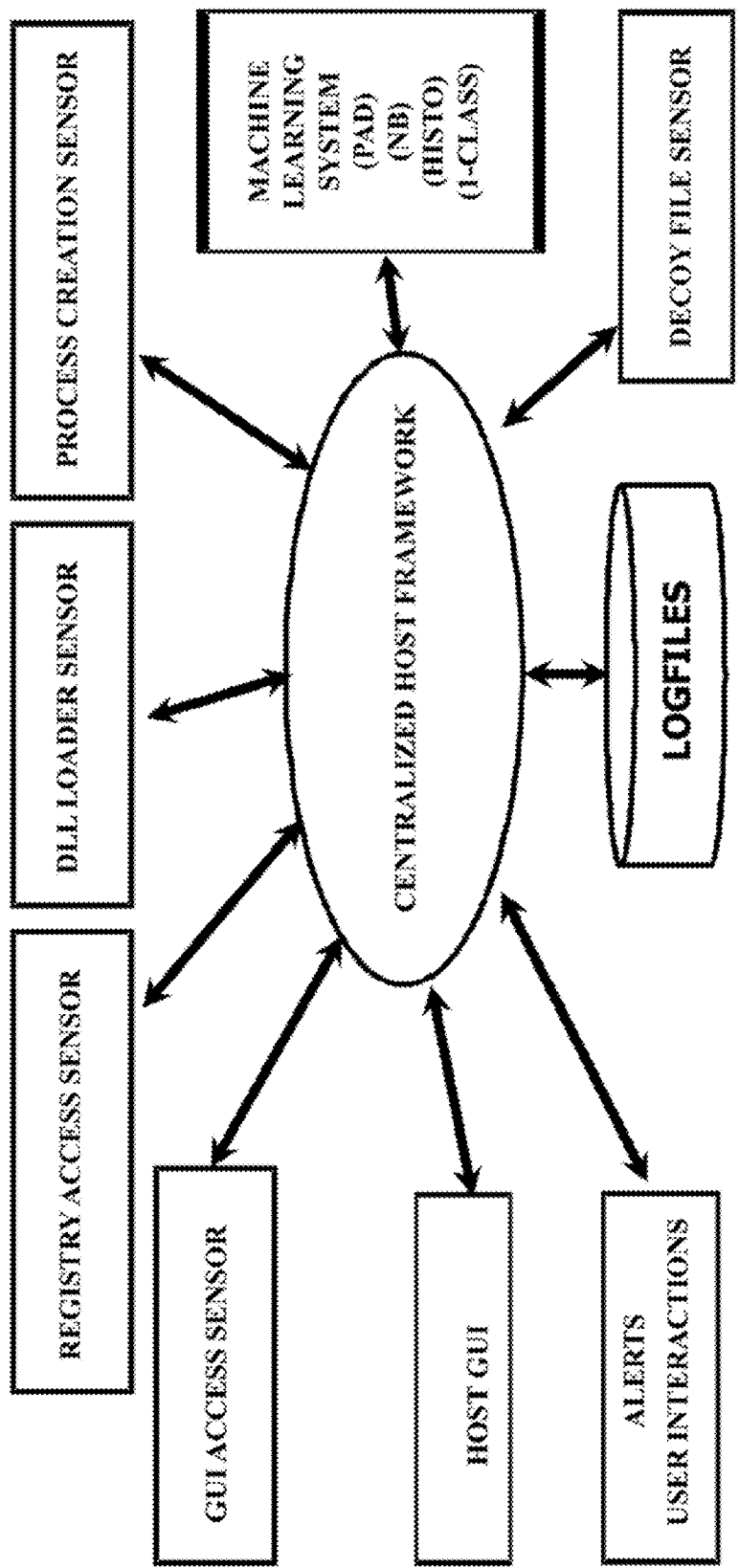
FIG. 2 is an exemplary system architecture that includes host-based sensors for monitoring user behavior, creating models of user behavior intent, and detect differences or changes in user behavior in accordance with some embodiments of the disclosed subject matter.
Figure 3:
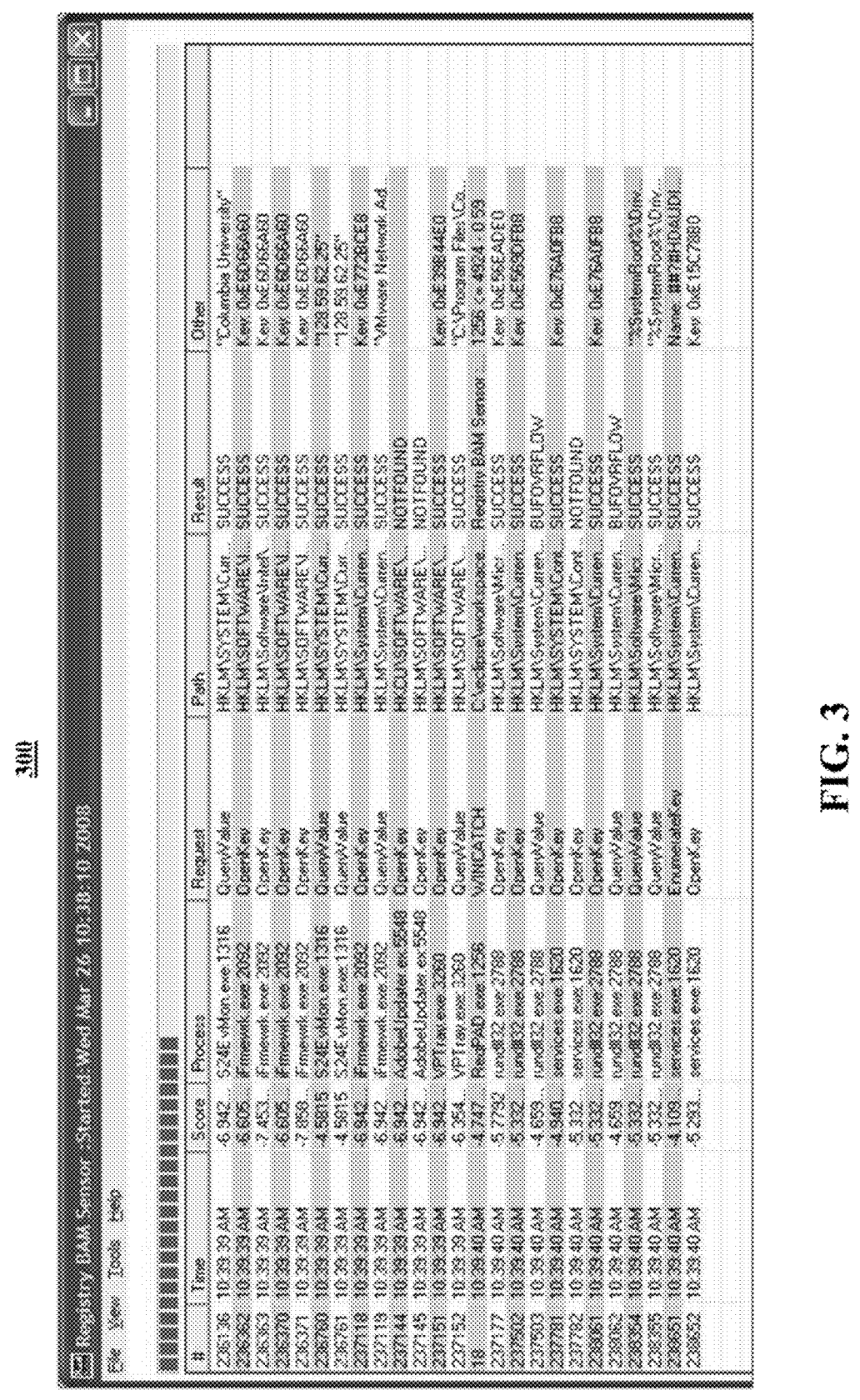

In some embodiments, detection and deception system 114 can include multiple sensors to monitor, audit, and/or capture data on the users of system 100. For example, detection and deception system 114 can include one or more sensors that monitor registry-based activities, process creation and destruction, window graphical user interface (GUI) access, dynamic link library (DLL) activity, and/or decoy information access (see, e.g., FIG. 2). Using such a sensor can obtain information on user activities, such as the process name and process identification, the process path, the parent of the process, the type of process action (e.g., the type of registry access, process creation, process destruction, etc.), the process command arguments, action flags (e.g., success or failure), and registry activity results. Each audit record or piece of information obtained by the sensor can be recorded with a timestamp. In a more particular example, the sensor can gather particular information based on the operating system used by the user. In a digital processing device using a Linux-based operating system, the sensor can use a kernel hook (e.g., the auditd daemon) to obtain process creation events and enriched user commands. In a digital processing device using a Microsoft Windows operating system, the sensor can use a low-level system driver, DLL registration mechanisms, and a system table hook to obtain registry-based activities, process creation and destruction, window GUI access, and DLL libraries activity. Examples of the different sensors are shown in FIG. 2. An illustrative example of a registry access sensor is shown, for example, in FIG. 3. As shown in screen 300, the sensor monitors and records process identification numbers, timestamps, scores, process names and command arguments, requests, process paths, results, and any other suitable information for a particular user.

Figure 4:
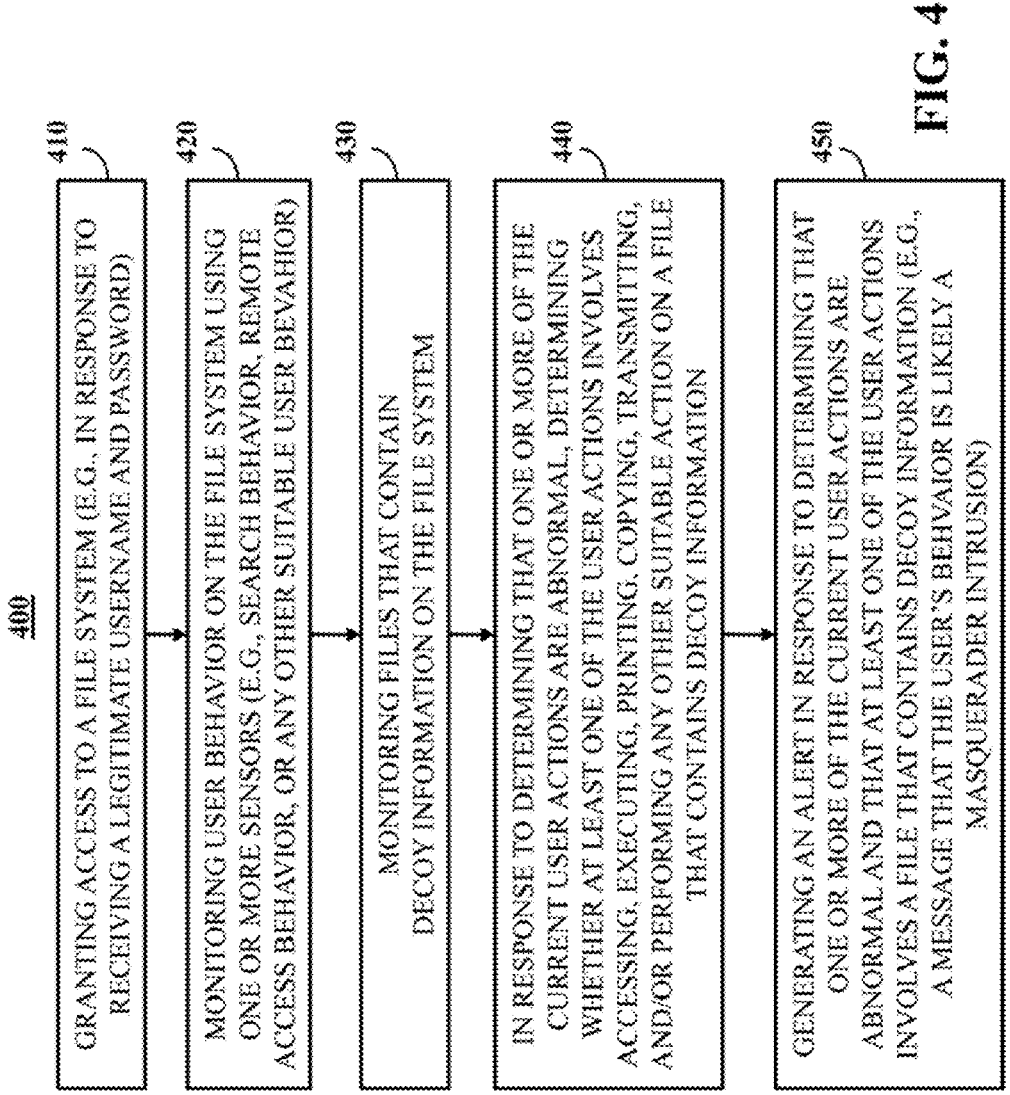
FIG. 4 is a diagram showing an example of a process for detecting masquerade attacks by monitoring whether current user behavior is abnormal as compared with previous user behavior and monitoring decoy information in accordance with some embodiments of the disclosed subject matter.

As described above, masquerade detection mechanisms that profile user actions to generate models of user behavior and intent and that monitor user actions and access of decoy information can be provided to users of collaborating systems 102, 104, and/or 106, masquerader/compromised computer 110, and/or communications network 108 of FIG. 1. FIG. 4 illustrates an example 400 of a process for providing masquerade detection mechanisms in accordance with some embodiments of the disclosed subject matter. As shown, access is granted to a file system at 410. For example, access can be granted in response to receiving a legitimate username and password.

It should be noted that, in response to granting access to a file system, the monitored user behavior (at 420), the decoy information (at 430), selected categories, generated models of user behavior and intent (at 440), generated alerts (at 450), or any other suitable action described herein can be associated with a particular user or a particular user type. For example, the monitored user behavior (e.g., user commands, user-initiated applications, registry-based activities, and/or DLL activities) and models can be stored and associated with a particular user based on username. In another example, the models can be stored and associated with a particular user type, such as an administrator user or a guest user.

In response, user behavior on the file system is monitored at 420. Similarly, one or more sensors (e.g., Windows sensors, Linux sensors, or sensors for any suitable operating system) can be used to monitor information on user activities, such as the process name and process identification, the process path, the parent of the process, the type of process action (e.g., the type of registry access, process creation, process destruction, etc.), the process command arguments, action flags (e.g., success or failure), and registry activity results.

At 430, files that contain decoy information on the file system can be generated and monitored. It should be noted that one downside of a false positive is annoyance of a legitimate user who can be alerted too frequently. On the other hand, one downside of a false negative (e.g., an undetected masquerader) can be far more dangerous. These files containing decoy information (e.g., a decoy password file, a file with bogus credit card information, etc.) can be deployed and monitored. Along with the generation of a model of user behavior and intent and the comparison of current user actions (e.g., user commands, user-initiated applications, registry-based activities, and/or DLL activities) with the generated model, the detection of the performance of an action on a file containing decoy information provides stronger evidence of malfeasance, thereby improving the accuracy of detection and deception system 114. Accordingly, decoy information can be used to reduce and/or eliminate false positives.

Decoy information and/or decoy documents can be generated and/or managed using any suitable approach. For example, detection and deception system 114 can search through files on a computer (e.g., one or more of collaborating systems 102, 104, and 106), receive templates, files, or any other suitable input from a legitimate user (e.g., an administrator user) of a computer, monitor traffic on communications network 108, or use any other suitable approach to create believable decoy information. In a more particular example, detection and deception system 114 can determine which files are generally accessed by a particular user (e.g., top ten, last twenty, etc.) and generate decoy information similar to those files. In another example, detection and deception system 114 can perform a search and determine various usernames, passwords, credit card information, and/or any other sensitive information that may be stored on one or more of collaborating system 102, 104, and 106. Using these search results, detection and deception system 114 can then create receipts, tax documents, and other form-based documents with decoy credentials, realistic names, addresses, and logins. Alternatively, detection and deception system 114 can monitor the file system and generate decoy documents with file names similar to the files accessed on the file system (e.g., a tax document with the file name "2009 Tax Form-1099-1") or with file types similar to the files accessed on the file system (e.g., PDF file, DOC file, URL link, HTML file, JPG file, etc.).

It should be noted that detection and deception system 114 can generate decoy information and decoy documents that comply with particular properties that enhance the deception for masqueraders. Decoy information can be generated such that the documents are believable, enticing, conspicuous, detectable, variable, differentiable from actual or authentic information, non-interfering with legitimate users, etc.

In some embodiments, decoy information can be combined with any suitable number of monitoring or alerting approaches, either internal or external, to detect masqueraders. For example, a beacon can be embedded in a document or any other suitable decoy information. As used herein, a beacon can be any suitable code or data that assist in the differentiation of decoy information from actual information and/or assists in indicating the malfeasance of an attacker illicitly accessing the decoy information. In some embodiments, these stealthy beacons can cause a signal to be transmitted to a server indicating when and/or where the particular decoy information was opened, executed, etc.

In another example, the decoy information, such as a decoy document, can be associated and/or embedded with one or more passive beacons. In a more particular example, a passive beacon in the form of a watermark can be embedded in the binary format of the document file or any other suitable location of the document file format. The watermark is detected when the decoy information is loaded in memory or transmitted in the open over a network (e.g., using the decoy file sensor of FIG. 2). In some embodiments, a host-based monitoring application can be configured to transmit signals or an alert when it detects the passive beacon in documents.

In yet another example, the content of the decoy information itself can be used to detect the potential presence of a masquerader. The content of the decoy information can include a bogus login (e.g., a bogus login and password for Google Mail). The bogus login to a website can be created in a decoy document and monitored by external approaches (e.g., polling a website or using a custom script that accesses mail.google.com and parses the bait account pages to gather account activity information).

Approaches for baiting inside attackers using decoy information are discussed in further detail in, for example, Keromytis et al., International Publication No. WO 2009/032379, published on Mar. 12, 2009, and Stolfo et al., U.S. Patent Application Publication No. 2010/0077483, published on Mar. 25, 2010, which are hereby incorporated by reference herein in their entireties.

Referring back to FIG. 4, user behavior and decoy information are monitored on the file system at 420 and 430. An illustrative process for generating models of user behavior and intent and determining that the current user actions are abnormal are described in further detail below in connection with FIG. 5. After determining that one or more of the current user actions are abnormal (e.g., determining that one or more of the current user actions deviate from the model of normal user behavior), it is also determined whether at least one of the current user actions involves accessing, executing, printing, copying, transmitting, or performing any other suitable action on a file that contains decoy information (a decoy document) at 440.

At 450, in response to determining that one or more of the current user actions are abnormal and in response to determining that at least one of the current user actions involves accessing, executing, printing, copying, transmitting, and/or performing any other suitable action on a file that contains decoy information, an alert is generated. For example, an alert component can transmit an email to the legitimate user of the file system. In response to receiving the alert (e.g., an email message), the legitimate user can be prompted to indicate whether the alert is a false alarm. In another example, an alert component can transmit a notification to an administrator user (e.g., an information technology professional). In yet another example, an alert component can transmit a message to a host sensor or a host-based monitoring application, such as an antivirus software application.

Figure 5:
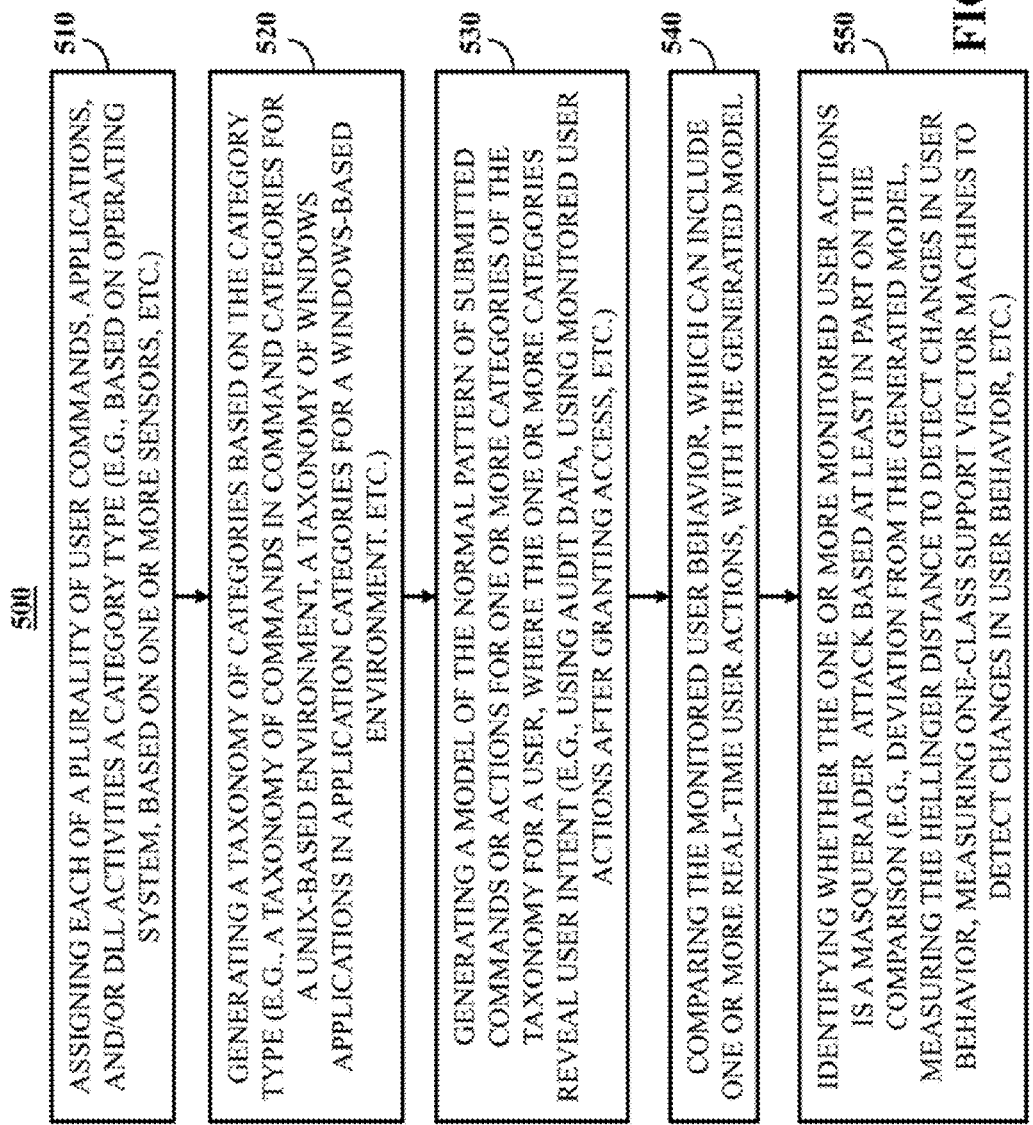
FIG. 5 is a diagram showing an example of a process for identifying whether current user behavior is a masquerade attack based on deviations from a generated model of user intent in accordance with some embodiments of the disclosed subject matter.

In accordance with some embodiments of the disclosed subject matter, models of user behavior and intent are generated and implemented using a process 500 as illustrated in FIG. 5. While masqueraders may be able to capture user credentials and/or confidential user information, these masqueraders are generally not able to capture or impersonate the behavior of the particular user. By generating models of user behavior and intent (e.g., using the normal pattern of submitted user actions) for a certain user, masqueraders can be accurately detected as their behavior is different from the behavior of the legitimate user. In some embodiments, the incorporation of decoy documents and monitoring actions performed on these decoy documents can reduce or eliminate false positives created by the one or more models.

It should be noted that, in some embodiments, user activities (e.g., user commands, user-initiated applications, registry-based activities, and/or DLL activities) can be placed into contextual categories. For example, user commands can be classified into one of multiple categories as certain categories of user commands can reveal user intent more than other categories. In another example, Windows applications can be classified into one of multiple categories of applications. In a more particular example, user search behavior can be an interesting group of user commands and/or command categories to monitor and profile since it indicates the user lacks information they are seeking Again, a masquerader is unlikely to have the depth of knowledge of the victim's machine (e.g., files, locations of important directories, available applications, etc.). Accordingly, a masquerader is likely to first perform information gathering and search commands before initiating specific actions. In another example, remote access to other systems and the communication or egress of large amounts of data to remote systems can be an interesting group of user commands and/or command categories to monitor and profile since such commands and/or categories can provide an indication of illegal copying or distribution of sensitive information.

In yet another example, a legitimate user tends to initiate the same repeated actions or activities each time the user logs in to their environment before using it by initiating multiple applications (e.g., read e-mail, open a web browser, start a chat session, etc.). Similarly, the legitimate user tends to clean up and shut down particular applications and perform particular actions when the user logs off Such repeated behaviors constitute a profile that can be modeled and used to check the authenticity of a user session before significant damage is done. Accordingly, certain categories from the taxonomy can reveal user intent for a particular user.

Referring back to FIG. 5, at 510, each action (e.g., user commands, user-initiated applications, registry-based activities, and/or DLL activities) of multiple actions can be assigned a category type. Category types can classify these actions or activities into particular categories, such as, for example, access control, applications, communications and networking, display and formatting, execution and program control, file system, I/O peripherals, search and information gathering, other, process management, system management, unknown, and utilities. Other examples of various categories are shown, for example, in the illustrative taxonomies of FIGS. 6 and 7.

Figure 6:
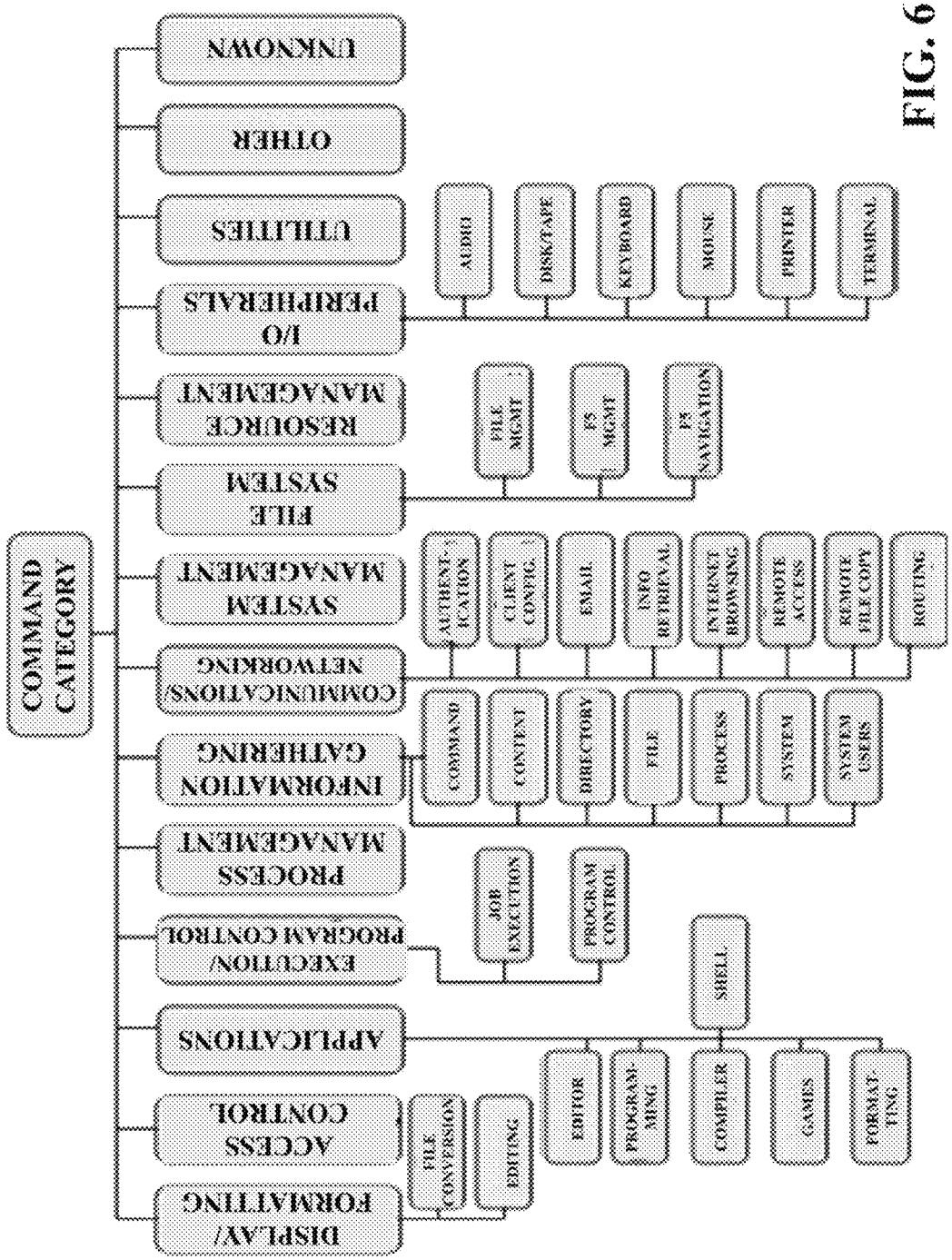
FIG. 6 is a diagram showing an example of a taxonomy of UNIX commands that are used to abstract sequences of user commands and actions in accordance with some embodiments of the disclosed subject matter.
Figure 7:
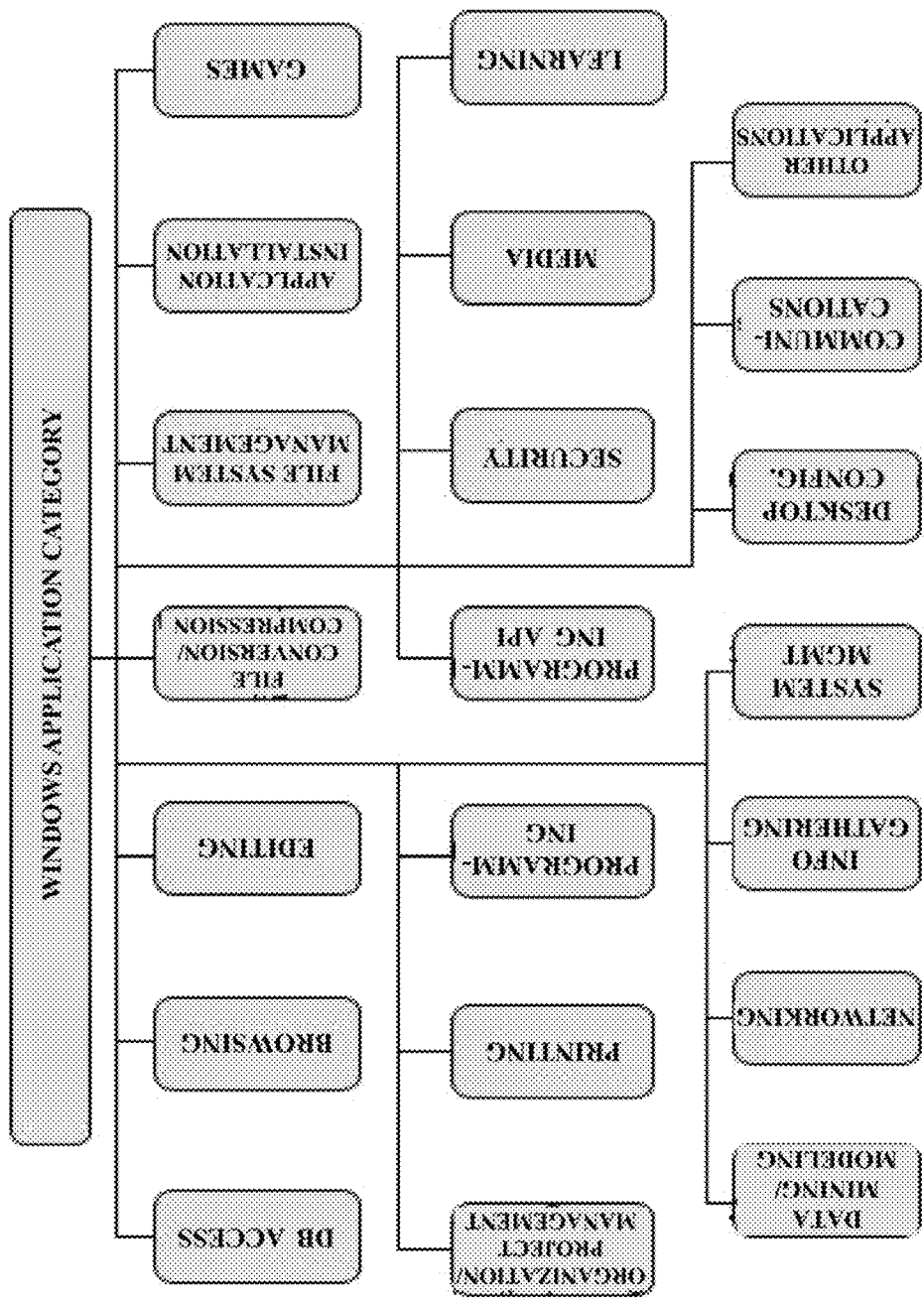
FIG. 7 is a diagram showing an example of a taxonomy of Microsoft Windows applications that are used to abstract applications, DLL activities, and/or registry-based activities in accordance with some embodiments of the disclosed subject matter.

As shown in FIGS. 6 and 7, some categories can be further divided or classified into sub-categories. For example, the display and formatting category can be further classified into file conversion commands or applications and editing commands or applications. In another example, the execution and program control category can be further classified into job execution commands and program control commands.

It should be noted that any other suitable category can also be created and that categories can be created based on, for example, operating environment (e.g., Windows, Unix, Chrome, etc.), user type (e.g., administrator, guest, etc.), etc. For example, FIG. 6 shows multiple categories created for a Unix command sequences issued by users, while FIG. 7 shows multiple categories created for a Windows operating environment with applications executed by users. In Unix systems, the search and information gathering category type can include user commands, such as find and fgrep, while the process management category type can include user commands, such as kill, nohup, and renice. In addition, the date, clock, and cal commands can be placed into the utilities category. The other and unknown categories can be used for commands that have been recognized but not classified under any other category and for commands that have not been identified or recognized, respectively.

Referring back to FIG. 5, a taxonomy of categories can be generated based on the assigned category type at 520. The generated taxonomy of categories, user commands, user-initiated applications, registry-based activities, and/or DLL activities can be used to readily identify and model particular user behavior. Examples of taxonomies for user commands in a Unix environment and for applications in a Windows environment are shown in FIGS. 6 and 7, respectively.

It should be noted that the taxonomy abstracts the audit data and enriches the meaning of a user's profile. That is, activities, such as commands, applications, or DLL activities, that perform similar types of actions are grouped together in one or more categories making profiled sequences more abstract and meaningful. A taxonomy can reduce complications, such as when "Never-Before-Seen-Commands" are observed, since distinct user commands are replaced by its category. Accordingly, user actions (e.g., user commands, user-initiated applications, registry-based activities, and/or DLL activities) are assigned a category type and the sequence of category types is modeled rather than individual actions.

At 530, a model of the user behavior and intent can be generated using, for example, audit data, monitored user actions, etc. As described above, some categories can reveal user intent more than other categories. Accordingly, particular categories that reveal user intent can be selected for modeling. For example, to reveal the intent of a particular user, categories relating to searching, access control privileges, and copying or printing information can be selected. Upon collecting user behavior from these categories (e.g., in a given window), a model can be generated of the normal pattern of submitted actions for one or more categories of the taxonomy for a particular user.

It should be noted, however, that user behavior varies for each user such that different categories can be selected for different users. For example, an administrative user can have a different set of available commands than a guest user. In another suitable embodiment, the detection and deception system 114 can prompt the user (e.g., the user that logged in, an administrative user, etc.) to input responses to questions relating to user behavior. For example, the user can be provided with an interface for inputting responses to questions relating to user search behavior (e.g., most frequent queries, particular folder locations, etc.). In another suitable example, an administrator user can be provided with an interface for selecting categories for particular users in particular divisions of a corporation. Alternatively, the detection and deception system 114 can select particular categories from the taxonomy based on user behavior (e.g., most frequent searches, top ten remote sources receiving transmissions of sensitive information, etc.).

Once these categories are identified, features representing such behavior can be extracted. For example, monitored data can be grouped into 10 second quanta of user activities, where seven features are extracted for each of these epochs—e.g., number of search actions (specific sections of the Windows registry, specific DLLs, and specific programs on the system are correlated with system search), number of non-search actions, number of user-induced actions (e.g., manually starting or killing a process, opening a window, manually searching for some file or some content, etc.), number of window touches (e.g., bringing a window into the foreground, closing a window, etc.), number of new processes, total number of processes running on the system, and total number of document editing applications running on the system. However, any suitable features can be extracted for each category.

Current user activities (e.g., real-time user actions) on the file system are monitored and compared to the generated model of "normal" user behavior and categories in order to determine its likelihood of being harmful at 540. Based on the comparison, it can be determined whether one or more of the monitored user actions are abnormal, thereby detecting a masquerader attack.

In some embodiments, generating a model of the submitted user behavior and comparing current user behavior with the model to determine its likelihood of being a masquerader attack in 530, 540, and 550 can be performed using Hellinger distance-based modeling approaches.

The Hellinger distance can be used to calculate the change in two frequency tables, where each table is a histogram representing the frequency of some variable at some particular moment in time. More particularly, in these embodiments, the frequency of user actions can be measured. Accordingly, a detector of abnormal behavior is created by modeling user action frequencies and the changes in that frequency.

The Hellinger distance can be defined as:

$$HD(f_p[\,],f_t[\,]) = \Sigma_{i=0}^{n-1}(\sqrt{f_p[i]} - \sqrt{f_t[i]})^2$$

where $f_p[\,]$ is the array of normalized frequencies for the first set, $f_t[\,]$ is the array of normalized frequencies for the second set, and n is the number of possible commands or categories. For example, the Hellinger distance metric can be applied in response to the issuance of an action (e.g., user commands, applications, registry-based activities, and/or DLL activities) by a particular user. A previous frequency table that modeled the previous actions in one or more categories is compared to a newly updated frequency table by modifying the frequency of the command types. Hence, each action creates a new or updated Hellinger distance score that is subjected to threshold logic. Each bin of the frequency table can be any category selected to model. In a general case, every category can be modeled and monitored.

In a more particular example, in order to detect changes in user behavior, the Hellinger distance between two blocks of actions of size w can be calculated. With each new action, the frequencies of the categories within the block of the last w commands can be counted. The window of w actions is then shifted by one action and the same frequencies for the new block can be counted.

In some embodiments, an average score over a particular number of blocks can be calculated to determine an overall score. In response to the average score being greater than a particular user threshold value, the block of actions (e.g., commands) can be deemed abnormal and a masquerader block.

Alternatively, in some embodiments, the rate of change of the Hellinger distance can be calculated. For example, a calculated Hellinger distance can be compared to a previously calculated Hellinger distance, where the difference between the Hellinger distances is determined. If the rate of change between the Hellinger distances is greater than a particular threshold value, the block of actions can be deemed abnormal and a masquerader block.

In some embodiments, generating a model of the submitted user behavior and comparing current user behavior with the model to determine its likelihood of being a masquerader attack in 530, 540, and 550 can be performed using support vector machine (SVM) modeling approaches.

Support vector machines (SVMs) are linear classifiers used for classification and regression and are known as maximal margin classifiers. Generally speaking, SVMs map input data into a high-dimensional feature space using a kernel function. The kernel function can be defined as:

$$k(x,y) = (\Phi(x), \Phi(y)), \text{ where } x, y \in X$$

X is the training data set and $\Phi$ is the feature mapping to a high-dimensional space X→F.

It should be noted that the feature mapping can be performed in any suitable manner. For example, in some embodiments, a frequency-based approach can be conducted, where the number of times a category retrieved using the taxonomy appears in the monitored data is counted. In another example, in some embodiments, a binary approach can be conducted, where the presence of the category in the monitored data is indicated.

Accordingly, methods, systems, and media are provided for detecting masquerade attacks by monitoring computer user behavior.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for detecting masquerade attacks, the method comprising:

monitoring, using a hardware processor, a first plurality of user actions in a computing environment;

generating a user intent model based on the first plurality of user actions;

monitoring a second plurality of user actions in the computing environment;

determining whether at least one of the second plurality of user actions deviates from the generated user intent model;

determining whether the second plurality of user actions include performing an action on a file in the computing environment that contains decoy information in response to determining that at least one of the second plurality of user actions deviates from the generated user intent model; and generating an alert in response to determining that the second plurality of user actions include performing an action on a file in the computing environment that contains decoy information.

2. The method of claim 1, further comprising assigning a category type to each of a plurality of user commands, applications, registry-based activities, and dynamic link library (DLL) activities in the computing environment.

3. The method of claim 2, further comprising:
generating a taxonomy of categories based on the category type.
selecting one or more categories from the taxonomy;
extracting a plurality of features for each category; and
generating the user intent model by using the first plurality of user actions with respect to the extracted features.

4. The method of claim 1, further comprising calculating a first Hellinger distance between a first frequency table that models the first plurality of user actions and a second frequency table that models the second plurality of user actions.

5. The method of claim 4, further comprising determining that at least one of the second plurality of user actions deviates from the user intent model in response to the first Hellinger distance being greater than a predefined threshold value.

6. The method of claim 4, further comprising:
calculating a second Hellinger distance between the second frequency table that models the second plurality of user actions and a third frequency table that models a third plurality of user actions; and
comparing the second Hellinger distance with the first Hellinger distance to determine whether the third plurality of user actions correspond to a masquerade attack.

7. The method of claim 1, further comprising associating the user intent model with at least one of: a particular user, the computing environment, a network, and a user type.

8. A system for detecting masquerade attacks, the system comprising:
at least one hardware processor that is configured to:
monitor a first plurality of user actions in a computing environment;
generate a user intent model based on the first plurality of user actions;
monitor a second plurality of user actions in the computing environment;
determine whether at least one of the second plurality of user actions deviates from the generated user intent model;
determine whether the second plurality of user actions include performing an action on a file in the computing environment that contains decoy information in response to determining that at least one of the second plurality of user actions deviates from the generated user intent model; and
generate an alert in response to determining that the second plurality of user actions include performing an action on a file in the computing environment that contains decoy information.

9. The system of claim 8, wherein the hardware processor is further configured to assign a category type to each of a plurality of user commands, applications, registry-based activities, and dynamic link library (DLL) activities in the computing environment.

10. The system of claim 9, wherein the hardware processor is further configured to:
generate a taxonomy of categories based on the category type.
select one or more categories from the taxonomy;
extract a plurality of features for each category; and
generate the user intent model by using the first plurality of user actions with respect to the extracted features.

11. The system of claim 8, wherein the hardware processor is further configured to calculate a first Hellinger distance between a first frequency table that models the first plurality of user actions and a second frequency table that models the second plurality of user actions.

12. The system of claim 11, wherein the hardware processor is further configured to determine that at least one of the second plurality of user actions deviates from the user intent model in response to the first Hellinger distance being greater than a predefined threshold value.

13. The system of claim 11, wherein the hardware processor is further configured to:
calculate a second Hellinger distance between the second frequency table that models the second plurality of user actions and a third frequency table that models a third plurality of user actions; and
compare the second Hellinger distance with the first Hellinger distance to determine whether the third plurality of user actions correspond to a masquerade attack.

14. The system of claim 8, wherein the hardware processor is further configured to associate the user intent model with at least one of: a particular user, the computing environment, a network, and a user type.

15. A non-transitory computer-readable medium containing computer-executable instructions that, when executed by a processor, cause the processor to perform a method for detecting masquerade attacks, the method comprising:
monitoring a first plurality of user actions in a computing environment;
generating a user intent model based on the first plurality of user actions;
monitoring a second plurality of user actions in the computing environment;
determining whether at least one of the second plurality of user actions deviates from the generated user intent model;
determining whether the second plurality of user actions include performing an action on a file in the computing environment that contains decoy information in response to determining that at least one of the second plurality of user actions deviates from the generated user intent model; and
generating an alert in response to determining that the second plurality of user actions include performing an action on a file in the computing environment that contains decoy information.

16. The non-transitory computer-readable medium of claim 15, wherein the method further comprises assigning a category type to each of a plurality of user commands, applications, registry-based activities, and dynamic link library (DLL) activities in the computing environment.

17. The non-transitory computer-readable medium of claim 16, wherein the method further comprises:
generating a taxonomy of categories based on the category type.
selecting one or more categories from the taxonomy;
extracting a plurality of features for each category; and
generating the user intent model by using the first plurality of user actions with respect to the extracted features.

18. The non-transitory computer-readable medium of claim 15, wherein the method further comprises calculating a first Hellinger distance between a first frequency table that models the first plurality of user actions and a second frequency table that models the second plurality of user actions.

19. The non-transitory computer-readable medium of claim 18, wherein the method further comprises determining that at least one of the second plurality of user actions deviates from the user intent model in response to the first Hellinger distance being greater than a predefined threshold value.

20. The non-transitory computer-readable medium of claim 18, wherein the method further comprises:
   calculating a second Hellinger distance between the second frequency table that models the second plurality of user actions and a third frequency table that models a third plurality of user actions; and
   comparing the second Hellinger distance with the first Hellinger distance to determine whether the third plurality of user actions correspond to a masquerade attack.

21. The non-transitory computer-readable medium of claim 15, wherein the method further comprises associating the user intent model with at least one of: a particular user, the computing environment, a network, and a user.

* * * * *